US012710753B2

(12) United States Patent
Siemer et al.

(10) Patent No.: US 12,710,753 B2
(45) Date of Patent: Aug. 18, 2026

(54) COMPUTER IMPLEMENTED METHOD AND SYSTEM FOR SUPPRESSING FALSE DUMP EVENTS

(71) Applicant: Caterpillar Inc., Peoria, IL (US)

(72) Inventors: Michael Siemer, Brisbane (AU); Gordon Mountford, Stafford Heights (AU); Adam Marshall Lewis, Brisbane (AU); Jan Sobus, Burpengary East (AU); Connor James Christopher Walker, Brisbane (AU); Jeremie Lacasse, Ste-marthe-sur-le-lac (CA)

(73) Assignee: Caterpillar Inc., Peoria, IL (US)

( * ) Notice: Subject to any disclaimer, the term of this patent is extended or adjusted under 35 U.S.C. 154(b) by 204 days.

(21) Appl. No.: 18/458,976

(22) Filed: Aug. 30, 2023

(65) Prior Publication Data

US 2025/0076876 A1 Mar. 6, 2025

(51) Int. Cl.
*G05D 1/00* (2024.01)

(52) U.S. Cl.
CPC .................................. *G05D 1/0094* (2013.01)

(58) Field of Classification Search
CPC ...... G05D 1/0094; E02F 9/2054; E02F 9/267; E02F 9/262; E02F 3/434; E02F 3/437; E02F 9/205; E02F 9/265; G06N 20/00
See application file for complete search history.

(56) References Cited

U.S. PATENT DOCUMENTS

| | | | | |
|---|---|---|---|---|
| 9,509,588 | B2 | 11/2016 | Matthews et al. | |
| 11,048,942 | B2 | 6/2021 | Yun et al. | |
| 11,352,013 | B1 * | 6/2022 | Srinivasan | G06V 20/44 |
| 11,726,007 | B2 | 8/2023 | Rajasekharan et al. | |
| 2002/0174082 | A1 | 11/2002 | Miloushev et al. | |
| 2012/0084047 | A1 * | 4/2012 | Vesterdal | B65G 67/00 702/141 |
| 2014/0203829 | A1 | 7/2014 | Yamada | |
| 2017/0276334 | A1 | 9/2017 | McMillan et al. | |
| 2019/0277687 | A1 * | 9/2019 | Blank | B60W 30/18 |
| 2020/0181879 | A1 * | 6/2020 | Halder | E02F 9/2054 |
| 2020/0211300 | A1 * | 7/2020 | Helms | H04Q 9/00 |
| 2020/0392703 | A1 * | 12/2020 | Sherlock | G01F 15/068 |

(Continued)

FOREIGN PATENT DOCUMENTS

| | | | |
|---|---|---|---|
| CN | 103927258 | A | 7/2014 |
| CN | 113459923 | A | 10/2021 |

(Continued)

OTHER PUBLICATIONS

Machine Translation: DE-102020214518-A1 (Year: 2022).*

(Continued)

*Primary Examiner* — Anne Marie Antonucci
*Assistant Examiner* — Connor L Knight

(57) ABSTRACT

A worksite tracking system uses sensor data associated with operations of a machine on a worksite to detect when the machine performs a dump event to dump material at the worksite, and to update tracking data that tracks machine operations and material movement at the worksite. If sensor data causes detection of a false dump event that did not actually occur, the worksite tracking system identifies the detected false dump event and suppresses corresponding information to update and correct the tracking data.

20 Claims, 7 Drawing Sheets

(56) References Cited

U.S. PATENT DOCUMENTS

| | | | | |
|---|---|---|---|---|
| 2021/0216889 | A1 | 7/2021 | Spurgeon et al. | |
| 2021/0256420 | A1* | 8/2021 | Elisha | G06N 20/00 |
| 2021/0292999 | A1* | 9/2021 | Hamada | G07C 5/0841 |
| 2021/0403062 | A1* | 12/2021 | Bramucci | B61L 3/125 |
| 2022/0314860 | A1* | 10/2022 | Iyer | G01M 1/122 |

FOREIGN PATENT DOCUMENTS

| | | | | |
|---|---|---|---|---|
| DE | 102020214518 | A1 * | 3/2022 | G01G 19/08 |
| JP | 6838410 | B2 | 3/2021 | |
| KR | 20230124327 | A | 8/2023 | |
| WO | WO2001027896 | A1 | 4/2001 | |
| WO | WO2016118122 | A1 | 7/2016 | |

OTHER PUBLICATIONS

Vasenev A. et al: “An information fusion approach for filtering GNSS data sets collected during construction operations”, Advanced Engineering Informatics, vol. 28, Issue No. 4, pp. 297-310, Oct. 1, 2014 (Oct. 1, 2014).

Written Opinion and International Search Report for Int’l. Patent Appln. No. PCT/US2024/038126, mailed Oct. 25, 2024 (13 pgs).

* cited by examiner

COMPUTER IMPLEMENTED METHOD AND SYSTEM FOR SUPPRESSING FALSE DUMP EVENTS

TECHNICAL FIELD

The present disclosure relates to tracking operations of machines and movements of material at a worksite and, more particularly, to identifying erroneously-detected dump events and updating corresponding tracking data to suppress the erroneously-detected dump events.

BACKGROUND

A machine, such as a haul truck, may transport loads of material between locations at a worksite. For example, the machine may be loaded with material at a first location at the worksite, drive to a second location at the worksite, and dump the material at the second location at the worksite. A worksite tracking system may use sensor data and/or other information to determine operations that have been performed by one or more machines on the worksite, for instance to track operations of the machines and/or to track corresponding movements of material on the worksite.

Various systems have been developed in the past to track and/or manage operations at a worksite. For example, WO 2016/118122 to Ristovski, et. al. (hereinafter "Ristovski"), describes a truck assignment system in which sensor data and other information about mining operations can be used to predict operations of trucks, including operations associated with the trucks dumping material at dump sites. For example, data processed in the system described by Ristovski can be used to predict durations of activities performed by the trucks, such as activities associated with dumping of material by the trucks, trucks driving while empty, trucks being loaded with material, and trucks driving while loaded with material.

The system described by Ristovski, however, predicts such activity data in order to determine when and how to assign trucks to perform tasks at a worksite, for instance by adjusting the number of trucks operating at the worksite based on activities that are predicted to occur in the future. Accordingly, the system described by Ristovski is focused on fleet management based on predictions of future truck activities at a worksite, and may have limited abilities to improve accuracy of historical records associated with machine operations and material movements that have already occurred at a worksite.

Examples of the present disclosure are directed to overcoming the deficiencies noted above.

SUMMARY

According to a first aspect of the present disclosure, a computer-implemented method includes receiving, by a computing system including a processor, sensor data indicative of operations of a machine at a worksite. The computer-implemented method also includes detecting, by the computing system, a dump event indicated by the sensor data. The computer-implemented method additionally includes determining, by the computing system, tracking data associated with the worksite based on the dump event. The computer-implemented method further includes determining, by the computing system, that the dump event indicated by the sensor data is a false dump event that did not occur. The computer-implemented method also includes suppressing, by the computing system, the false dump event by re-determining the tracking data based on determining that the dump event did not occur.

According to a second aspect of the present disclosure, a computing system includes a processor and a memory having stored thereon computer-executable instructions. The computer-executable instructions, when executed by the processor, cause the processor to receive sensor data indicative of operations of a machine at a worksite. The computer-executable instructions also cause the processor to detect a dump event indicated by the sensor data. The computer-executable instructions additionally cause the processor to determine tracking data associated with the worksite based on the dump event. The computer-executable instructions further cause the processor to determine that the dump event indicated by the sensor data is a false dump event that did not occur. The computer-executable instructions also cause the processor to suppress the false dump event by re-determining the tracking data based on determining that the dump event did not occur.

According to a third aspect of the present disclosure, a system includes a machine and a computing system. The machine includes a work tool configured to transport and dump material at a worksite. The machine also includes a sensor configured to capture sensor data associated with the work tool. The machine additionally includes a wireless communication interface configured to transmit the sensor data. The computing system is configured to receive the sensor data transmitted by the wireless communication interface of the machine. The computing system is also configured to detect a dump event indicated by the sensor data. The computing system is additionally configured to determine tracking data associated with the worksite based on the dump event. The computing system is further configured to determine that the dump event indicated by the sensor data is a false dump event that did not occur. The computing system is also configured to suppress the false dump event by re-determining the tracking data based on determining that the dump event did not occur.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
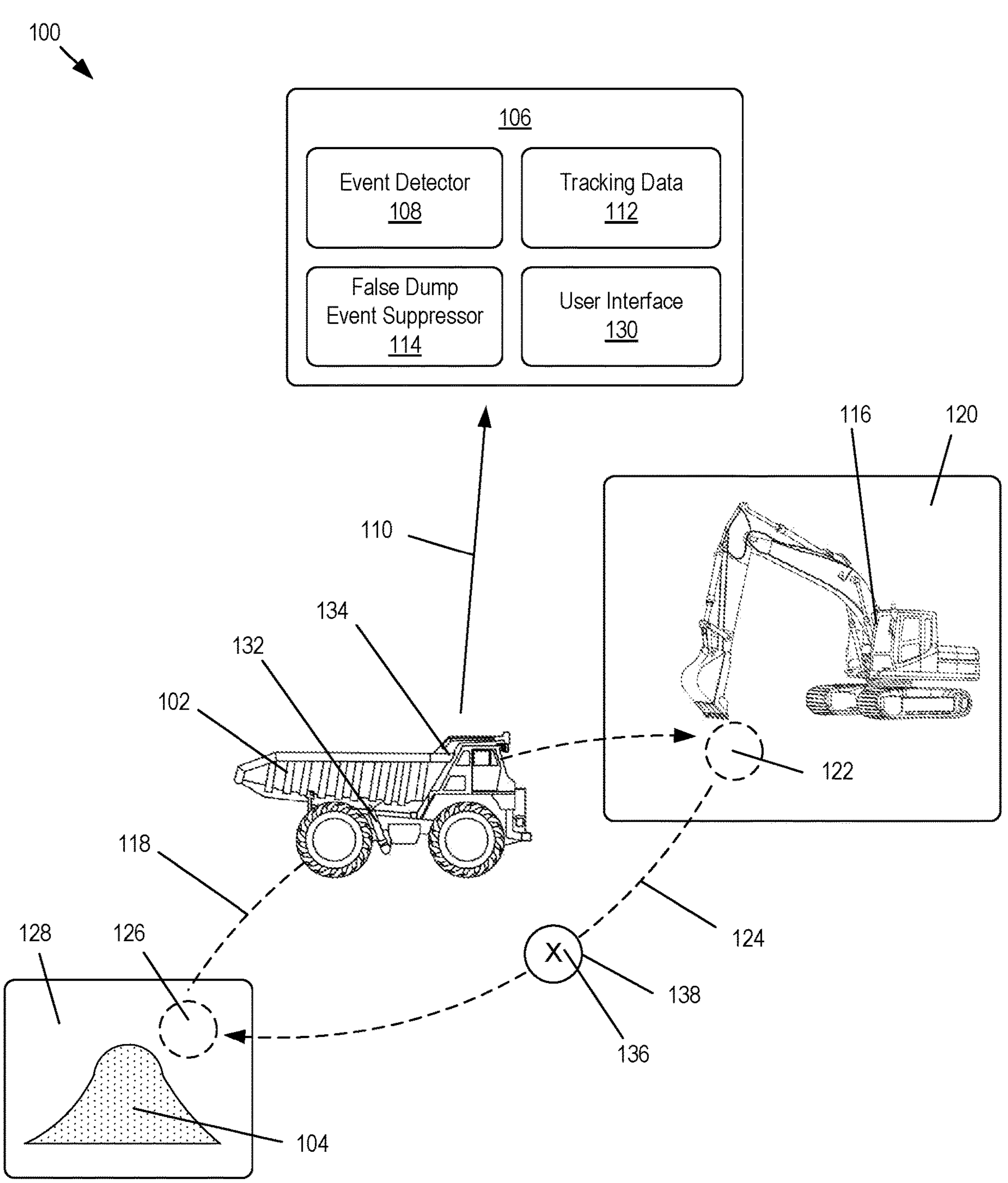
FIG. 1 is an exemplary diagrammatic illustration of a worksite at which a machine transports material.

FIG. 1 is an exemplary diagrammatic illustration of a worksite 100 at which a machine 102 transports material 104. For example, the machine 102 can be a haul truck that transports material 104 between locations at the worksite 100. Although one machine 102 is shown in FIG. 1, in some examples multiple machines may operate at the worksite 100. For instance, multiple haul trucks may operate at the worksite 100 to simultaneously move different loads of material 104 around the worksite 100.

A worksite tracking system 106 can be a computer-implemented system that detects and tracks events that occur on the worksite 100. Such events can include travel events associated with travel of one or more machines, material events associated with movements of material 104 by the machine 102 and/or other machines, loading events associated with loading of the machine 102 and/or other machines with material 104, and dump events associated with unloading of material 104 from the machine 102 and/or other machines.

For example, an event detector 108 of the worksite tracking system 106 can use sensor data 110 associated with the machine 102 and/or other machines to detect events that have occurred in association with the machines and/or material at the worksite 100. Based on such detected events, the worksite tracking system 106 can generate and/or update tracking data 112 associated with the worksite 100. The tracking data 112 can indicate when and where detected events occurred, identify which machines were associated with detected events, identify types and/or amounts of material 104 that were moved between locations at the worksite 100 based on detected events, and/or other types of information about operations performed at the worksite 100 based on detected events.

In some situations, the sensor data 110 provided to the worksite tracking system 106 may erroneously indicate that a dump event has occurred, even though a machine has not actually dumped material 104. As such, the event detector 108 may erroneously determine that a dump event has occurred, and update the tracking data 112 based on the erroneous dump event. However, a false dump event suppressor 114 associated with the worksite tracking system 106 can be configured to identify false dump events that were erroneously indicated by sensor data 110 and/or were erroneously detected by the event detector 108. Accordingly, the worksite tracking system 106 can update and/or re-determine the tracking data 112 based on removing and/or suppressing information associated with false dump events that have been identified via the false dump event suppressor 114, thereby causing the tracking data 112 to more accurately reflect events and operations that have occurred at the worksite 100.

The worksite 100 can be a mine site, a quarry, a construction site, a farm, or any other type of worksite or work environment. The material 104 can include one or more types of material, such as rocks, gravel, dirt, sand, lumber, construction material, water, other liquids, and/or other materials. The machine 102 can be a vehicle, a piece of heavy machinery, a piece of industrial equipment, or any other type of machine that can transport material 104 and can perform operations to dump material 104 at one or more locations at the worksite 100.

For example, the machine 102 can be a commercial or work machine that is configured to transport and dump material 104, such as a haul truck, mining truck, articulated truck, tanker, or other type of machine. In some examples, a loading machine 116 may also be present at the worksite 100, and can be configured to load material 104 onto the machine 102 such that the machine 102 can transport the material 104 to a different location at the worksite 100. For example, the loading machine 116 may be an excavator, or other mobile or stationary equipment, that is configured to load material 104 onto or into the machine 102.

The machine 102 may have one or more work tools or implements that allow the machine 102 to transport and dump material 104. For example, a haul truck can have a bed that can be loaded with material 104 such that the haul truck can transport the material 104. The bed of the haul truck may also be movable relative to other portions of the haul truck, for instance such that the bed can be raised at an angle and cause material 104 to be dumped from the bed.

The machine 102 can be a staffed machine, a semi-autonomous machine, or an autonomous machine. In examples in which the machine 102 is a staffed machine or a semi-autonomous machine, a human operator or driver can operate, control, or direct some or all of the functions of the machine 102. However, in examples in which the machine 102 is autonomous or semi-autonomous, functions of the machine 102, such as steering, speed adjustments, work tool positioning and movement, and/or other functions can be fully or partially controlled by on-board and/or off-board controllers or other computing devices associated with the machine 102.

The machine 102 can be used to perform instances of a work cycle that includes multiple segments. As an example, a work cycle may include an unloaded travel segment 118 in which the machine 102 travels to a loading area 120 while not carrying material 104, a loading segment 122 in which the machine 102 is loaded with material 104 by the loading machine 116 or another loading mechanism at the loading area 120, a loaded travel segment 124 in which the machine 102 travels while loaded with material 104, and an unloading segment 126 in which the machine 102 unloads the material 104 via a dump event. As shown in FIG. 1, the machine 102 may perform the unloading segment 126 and/or a corresponding dump event at an unloading area 128 at the worksite 100.

Accordingly, in some examples, the worksite tracking system 106 can be configured to determine, in response to a dump event being detected by the event detector 108, that one work cycle ended with an unloading segment 126 associated with the detected dump event, and that a new work cycle begins with a subsequent unloaded travel segment 118 that follows the unloading segment 126 associated with the detected dump event. Detection of a dump event by the event detector 108 can accordingly serve as a trigger for the worksite tracking system 106 to identify other events that preceded and/or followed the dump event, for instance by evaluating other preceding and/or subsequent sensor data 110 to determine which operations were performed before and after the dump event so that the tracking data 112 can be updated to reflect those events.

For example, the worksite tracking system 106 may use sensor data 110 associated with operations of the machine 102 before, during, and/or after a detected dump event to identify periods of travel and periods in which the machine 102 was stopped. The worksite tracking system 106 can also determine, via the event detector 108, which of those periods were likely to be associated with the unloaded travel segment 118, the loading segment 122, the loaded travel segment 124, and the unloading segment 126 of one or more work cycles. The worksite tracking system 106 can correspondingly update the tracking data 112 to indicate durations of the work cycles and/or segments of the work cycles, identify which segments of the work cycles occurred at which times and which locations at the worksite 100, and/or otherwise update the tracking data tracking data 112.

Although one loading area 120 and one unloading area 128 are shown in FIG. 1, in some examples more than one loading area 120 and/or more than one unloading area 128 may be present at the worksite 100. Accordingly, the machine 102 may perform different instances of a work cycle by traveling between the same and/or different loading areas and unloading areas. As an example, the machine 102 may be loaded with a first load of material 104 at a first loading area, dump the first load of material 104 at a first unloading area, and then return to the first loading area or travel to a different second loading area to be loaded with a second load of material 104. The machine 102 can then travel back to the first unloading area or travel to a different second unloading area to dump the second load of material 104. However, in other examples, the machine 102 may travel repeatedly between the same loading area 120 and the same unloading area 128 during different instances of a work cycle.

In some examples, loading areas and/or unloading areas may be predefined areas at the worksite 100, and may accordingly be designated as loading areas and/or unloading areas in the tracking data 112. For example, the tracking data 112 may include, or be associated with, map data that corresponds with a map of the worksite 100. Accordingly, the tracking data 112 may indicate locations of areas on the map of the worksite 100 that have been designated as loading areas and/or unloading areas, for instance based on user input or other data provided to the worksite tracking system 106 that define areas that are considered to be loading areas and/or unloading areas.

However, in other examples, loading areas and/or unloading areas may not be predefined areas, and can be determined to be any locations at the worksite 100 at which corresponding loading events and/or dump events occur. For example, the unloading area 128 may not be a predefined in map data associated with the worksite 100. However, if the event detector 108 determines that a dump event occurred at a particular location at the worksite 100, the worksite tracking system 106 may update the tracking data 112 to indicate that the particular location is, or may be, an unloading area at which a loaded travel segment of a work cycle ended, an unloading segment of the work cycle occurred, and/or an unloaded travel segment of the work cycle began. Similarly, if the event detector 108 determines that a loading event occurred at a particular location at the worksite 100, the worksite tracking system 106 may update the tracking data 112 to indicate that the particular location is, or may be, a loading area at which an unloaded travel segment of a work cycle ended, a loading segment of the work cycle occurred, and/or a loaded travel segment of the work cycle began.

The worksite tracking system 106 may have a user interface 130 that is configured to present information to users of the worksite tracking system 106. The user interface 130 can be presented via a computing system that executes the worksite tracking system 106, and/or can be presented via a mobile device, laptop computer, or other client computing device that can access the worksite tracking system 106 via the Internet or another data connection.

For example, the user interface 130 may present the tracking data 112 and/or information derived from the tracking data 112. As an example, the user interface 130 may display a map of the worksite 100, and use the tracking data 112 to overlay visual representations of detected events and/or other information on the map. As another example, the user interface 130 may use tracking data 112 to determine information associated with one or more work cycles performed by the machine 102, and may display a timeline of the work cycles that indicates times and/or locations of detected events and/or segments of the work cycles. As still other examples, the user interface 130 may use the tracking data 112 to present information indicating current and/or historical locations of the machine 102 and/or other machines on the worksite 100, current and/or historical positions, amounts, and/or types of material 104 on the worksite 100, and/or any other information associated with events and operations on the worksite 100. The user interface 130 may prevent static information associated with the worksite 100 that correspond with selected points in time, and/or can present dynamic or temporal information based on operations over a period of time.

In some examples, the worksite tracking system 106 may also, or alternately, output the tracking data 112 to other systems and/or use the tracking data 112 to determine productivity metrics associated with individual machines and/or the worksite 100. As a non-limiting example, the worksite tracking system 106 can use the tracking data 112 to generate a report indicating, for a particular workday, a count of how many work cycles were performed by the machine 102 and/or other machines at the worksite 100 during that particular workday, an amount of material 104 that was moved during the workday, types and/or amounts of material 104 delivered to individual unloading areas during the workday, and/or other information associated with operations at the worksite during the workday. Such a report generated by the worksite tracking system 106 may be displayed via the user interface 130, be transmitted to designated email addresses and/or other systems, be stored for later review or analysis, and/or otherwise be output by the worksite tracking system 106.

As discussed above, the worksite tracking system 106 can determine the tracking data 112 based at least in part on sensor data 110 associated with the machine 102 and/or other machines. The event detector 108 can analyze the sensor data 110 to detect events that have occurred at the worksite 100, such that the worksite tracking system 106 can update the tracking data 112 based on such detected events.

The machine 102 can have one or more sensors 132 that collect one or more types of sensor data 110 while the machine 102 is in operation. For example, sensors 132 can include dump switch sensors, bed position sensors, strut pressure sensor, payload weight sensors, Global Positioning System (GPS) sensors, other location and/or positioning sensors, speed sensors, cameras, LIDAR sensors, RADAR sensors, other optical sensors or perception systems, temperature sensors, tire pressure sensors, battery state of health (SoH) sensors, fuel level sensors, and/or other types of sensors.

The machine 102 can have one or more wireless communication interfaces 134, such as cellular interfaces, WiFi® interfaces, Bluetooth® interfaces, machine-to-machine data interfaces, and/or other types of wireless communication interfaces. The wireless communication interfaces 134 can include modems, receivers, transmitters, antennas, and/or other hardware or software elements configured to send and receive data. Accordingly, sensor data 110 captured by sensors 132 of the machine 102, and/or derived from information captured by the sensors 132, can be transmitted via the wireless communication interfaces 134 to the worksite tracking system 106.

One or more types of sensors 132 of the machine 102 can collect sensor data 110 that may be indicative of occurrences of dump events. For example, the machine 102 may be a haul truck with a bed that can be raised, and can have a dump switch, strut pressure sensor, and/or bed position sensor that is configured to detect when the bed is raised and/or moves more than a threshold distance away from other portions of the haul truck. Accordingly, sensor data 110 captured by such sensors 132 may indicate that the bed of the haul trick has been raised, and that material 104 in the bed may have accordingly been dumped. As another example, the machine 102 may have a payload weight sensor that measures a weight of material 104 being carried by the machine 102. Accordingly, sensor data 110 captured by the payload weight sensor can indicate when the weight of material 104 being carried by the machine 102 decreases, thereby indicating that material 104 may have been dumped.

Such sensor data 110 can be transmitted to the worksite tracking system 106, and can be used by the event detector 108 to detect the occurrences of dump events associated with the machine 102. The worksite tracking system 106 can also update sensor data 110 based on detected dump events. For example, if the event detector 108 determines based on sensor data 110 that a dump event occurred in association with the machine 102 at a particular time and location, the worksite tracking system 106 can use sensor data 110 associated before and/or after the detected dump event to determine that travel of the machine 102 immediately before the time and location of the detected dump event was likely part of a loaded travel segment of a work cycle, that the detected dump event was associated with an unloading segment that completed the work cycle, and that subsequent travel of the machine 102 following the detected dump event was likely part of an unloaded travel segment of the next work cycle.

The worksite tracking system 106 can accordingly update the tracking data 112 to indicate the time and location of the detected dump event, increment a count of dump events that have occurred at the worksite 100, indicate than an amount of material 104 most recently loaded onto the machine 102 prior to the detected dump event is now present at the location of the detected dump event, and update work cycle tracking metrics associated with the machine 102 and/or the worksite 100. For instance, based on the detection of the dump event and corresponding determinations of when and where a preceding loaded travel segment ended and a subsequent unloaded travel segment began, the worksite tracking system 106 may update work cycle metrics such as counts of overall work cycles and/or work cycle segments that have been completed, durations of work cycle segments, locations of work cycle segments, and/or other types of information.

However, in some situations, one or more sensors 132 of the machine 102 may be faulty and/or provide sensor data 110 that causes the event detector 108 to detect a dump event that did not actually occur. As an example, a dump switch or strut pressure sensor of a haul truck may be faulty, and capture or report erroneous sensor data 110 that indicates that the bed of the haul truck was raised at a time and location when the bed was not actually raised. Similarly, a faulty payload weight sensor may provide erroneous weight data indicating that a weight of a payload carried by the machine 102 has decreased, even though the same amount of material 104 is still being carried by the machine 102 and a dump event has not actually occurred.

As another example, if a haul truck is driving on a bumpy road or other uneven portions of the worksite 100, sensor data 110 captured by one or more sensors 132 may indicate to the event detector 108 that the bed of the haul truck was raised as part of a dump event. However, the movement of the bed indicated by the sensor data 110 may actually have been caused by uneven driving conditions, and was not movement associated with the bed being raised to dump material 104.

As yet another example, a bed of a haul truck may intentionally be raised in order to clean and wash out the bed, as part of a maintenance operation, or for any other reason that is not associated with a dump event. However, sensor data 110 captured by one or more sensors 132 while the bed is raised for a reason other than for a dump event may cause the event detector 108 to erroneously determine that the bed of the haul truck was raised as part of a dump event. Similarly, a signal from a dump switch may indicate that an operator started to raise the bed of the haul truck, such that the event detector 108 determines that a dump event occurred based on the signal, but the duration of the signal may actually indicate that the raising of the haul truck bed was quickly canceled by the operator such that no dump event actually occurred.

Accordingly, for various reasons, the event detector 108 may erroneously detect dump events that have not actually occurred, such as a false dump event 136 as shown in FIG. 1. For instance, the machine 102 may have been loaded with material 104 at loading area 120 during a loading segment 122 of a work cycle. The machine 102 may have then begun a loaded travel segment 124 and traveled towards the unloading area 128 where an operator of the machine 102 planned to dump the material 104. However, sensor data 110 associated with travel of the machine 102 after the machine 102 departs the loading area 120 may cause the event detector 108 to erroneously determine that a dump event occurred at a location 138 between the loading area 120 and the unloading area 128. Based on the erroneous detection of the dump event, the worksite tracking system 106 may update the tracking data 112 to indicate that a load of material 104 was dumped at the location 138, that the loaded travel segment 124 of the work cycle ended at the location 138, and that subsequent travel of the machine 102 between the location 138 and the unloading area 128 was associated with an unloaded travel segment of the work cycle or a subsequent work cycle. The updated tracking data 112 can accordingly be inaccurate, because the machine 102 did not actually dump material 104 at the location 138 and travel between the location 138 and the unloading area 128 should be associated with the loaded travel segment 124 of the work cycle.

If the machine 102 actually does dump material 104 at the unloading area 128, corresponding sensor data 110 may cause the event detector 108 to detect the occurrence of another dump event at the unloading area 128. The worksite tracking system 106 may accordingly attempt to update the tracking data 112 based on this detected dump event. However, because the tracking data 112 erroneously indicates that the machine 102 already dumped material 104 at location 138 and may erroneously indicate that the machine 102 was traveling in an unloaded state when the machine 102 reached the unloading area 128, the worksite tracking system 106 may be unable to accurately update the tracking data 112 to reflect that the machine 102 dumped material 104 at the unloading area 128, or may update the tracking data 112 to erroneously indicate that dump events occurred at both the location 138 and the unloading area 128.

However, the false dump event suppressor 114 described herein can identify and suppress detected dump events, such as the false dump event 136, that did not actually occur. The false dump event suppressor 114 can thereby cause the worksite tracking system 106 to update and/or correct the tracking data 112 to reflect that such erroneously-detected dump events did not occur.

For example, the worksite tracking system 106 may have initially updated the tracking data 112 based on detection of the false dump event 136 as discussed above to erroneously indicate that the loaded travel segment 124 ended at location 138, that material 104 was dumped at location 138, and that the unloaded travel segment 118 began at location 138. However, the false dump event suppressor 114 can determine that the false dump event 136 did not actually occur, and that the worksite tracking system 106 should not have updated the tracking data 112 based on the false dump event 136. Accordingly, the false dump event suppressor 114 can cause the worksite tracking system 106 to suppress the false dump event 136 by updating the tracking data 112 to indicate that the loaded travel segment 124 did not end at location 138, that material 104 was not dumped at location 138, and that the unloaded travel segment 118 did not begin at location 138. Based on sensor data 110 indicating that a dump event did occur at unloading area 128 after the machine 102 left location 138, the worksite tracking system 106 may accordingly update the tracking data 112 further to indicate that the loaded travel segment 124 instead ended at the unloading area 128, that the material 104 was instead dumped at the unloading area 128, and that the unloaded travel segment 118 instead began at the unloading area 128.

Suppression of a false dump event via the false dump event suppressor 114 can cause the worksite tracking system 106 to update or redetermine the tracking data 112 to reflect that the false dump event did not occur. For example, the worksite tracking system 106 may have initially determined that the false dump event marked a breakpoint between two work cycles, used sensor data 110 associated with operations before and/or after the false dump event to determine identities and durations of segments of the work cycles, and updated the tracking data 112 accordingly. However, when the false dump event is suppressed, the worksite tracking system 106 can reevaluate the sensor data 110 that has previously been associated with different work cycles before and after the false dump event to determine new and/or updated tracking data associated with a longer work cycle that does not include the false dump event and that may encompass some or all of the time periods that had previously been determined to be associated with different work cycles. An example of reevaluating sensor data 110 and updating the tracking data 112 in response suppression of a false dump event is discussed further below with respect to FIG. 2.

In some examples, the false dump event suppressor 114 can be configured to identify and suppress false dump events based at least in part on user input provided by a user of the worksite tracking system 106. For example, the worksite tracking system 106 may use the tracking data 112 to display information associated with detected dump events via the user interface 130, such as a list of detected dump events, a map showing locations of detected dump events on the worksite 100, a timeline of detected dump events, and/or other representations of detected dump events. The user interface 130 can be configured such that a user can select a representation of a detected dump event, for instance to view more information about the detected dump event and/or to provide user input associated with the detected dump event. If the user determines that the selected dump event was likely to have been a false dump event that did actually occur and was erroneously detected, the user can provide user input that causes the false dump event suppressor 114 to suppress the false dump event. As discussed above, suppression of a false dump event by the false dump event suppressor 114 can cause the worksite tracking system 106 to update the tracking data 112 to reflect that the false dump event did not occur.

In some examples, a user may select a representation of any detected dump event to evaluate the dump event and potentially mark the selected dump event as a false dump event that is to be suppressed. The user interface 130 may also allow users to select multiple dump events, such as a cluster of dump events on a map or multiple dump events included in a list, to potentially indicate that a set of selected dump events are false dump events that are to be suppressed.

The user interface may allow a user to select representations of any detected dump events, to review the dump events and/or provide user input that causes the false dump event suppressor 114 to suppress the user-selected dump events. However, in some examples, the false dump event suppressor 114 can also, or alternately, be configured to identify suspected false dump events, and to cause the user interface 130 to prompt a user to review the identified suspected false dump events. A suspected false dump event can be a detected dump event that the false dump event suppressor 114 identifies as a potential false dump event and surfaces for a user to further review in order to confirm the suspected false dump event as a false dump event that is to be suppressed, or to indicate that the suspected false dump event is a real dump event that should not be suppressed. For example, a user may provide input to indicate, to the false dump event suppressor 114 and/or other elements of the worksite tracking system 106, that a suspected false dump event identified by the false dump event suppressor 114 is indeed a false dump event that should be suppressed. Although the term "suspected false dump event" is used herein, a "suspected false dump event" can alternatively be referred to as a "potential false dump event," a "possible false dump event," or other equivalent terms.

As an example, the false dump event suppressor 114 can be configured to use a set of predefined and/or user-defined rules to identify suspected false dump events. The false dump event suppressor 114 may be configured with one or more predefined rules that are configured to detect suspected false dump events. As an example, the predefined rules may be configured to determine that a dump event is a suspected false dump event if the tracking data 112 and/or corresponding sensor data 110 does not identify a loading event that would indicate what type of material 104 and/or how much material 104 had been loaded onto the machine 102 and would have been dumped during the dump event, does not identify which loading machine 116 loaded the machine 102 with material 104, does not identify a source of material 104 that would have been loaded onto the machine 102 and then dumped during the detected dump event, and/or any other conditions that may be indicative of a suspected false dump event.

The false dump event suppressor 114 may also be configured with one or more user-defined rules that may also be configured to detect false dump events. A user of the worksite tracking system 106, such as a supervisor who manages operations at the worksite 100 or an owner or operator of the worksite 100, may define customized and/or worksite-specific rules that are intended to detect false dump events in association with the worksite 100, the machine 102, and/or a particular job or type of dump event being performed at the worksite 100.

The predefined and/or user-defined rules may define conditions that, if met by sensor data 110 and/or attributes of detected dump events indicated by the tracking data 112, indicates that the detected dump events qualify as suspected false dump events that are to be manually reviewed. For instance, in some examples the worksite tracking system 106 may maintain map data that defines locations of loading areas 120, unloading areas 128, roads, and/or other areas or zones at the worksite 100. Accordingly, in these examples, predefined and/or user-defined rules may cause the false dump event suppressor 114 to identify a detected dump event as a suspected false dump event if the detected dump event occurred outside of a defined unloading area 128, occurred on a road or other area that has been defined as a no-dump zone, or occurred at a time or location that does not correspond with a work plan that defines operations to be performed at the worksite 100. In other examples, predefined and/or user-defined rules may cause the false dump event suppressor 114 to identify a detected dump event associated with the machine 102 as a suspected false dump event if the detected dump event occurred within a threshold amount of time after the last detected loading event associated with the machine 102, occurred within a threshold distance from a loading area 120 or a location of the last detected loading event associated with the machine 102, occurred while the machine 102 was traveling at above a threshold speed, and/or occurred in association with any other condition defined by the rules.

The false dump event suppressor 114 can cause notifications and/or other data associated with such identified suspected false dump events to be displayed via the user interface 130. For example, the user interface 130 may highlight representations of the identified suspected false dump events on a map and/or list of detected dump events, or otherwise prompt a user to review the identified suspected false dump events.

Accordingly, a user can select a representation of an identified suspected false dump event via the user interface 130. User selection of a suspected false dump event can prompt the user interface 130 to display more information about the suspected false dump event, such as sensor data 110 that was used to detect the suspected false dump event, work cycle information in tracking data 112 that is associated with the suspected false dump event, timeline information associated with operations of the machine that is associated with the suspected false dump event, and/or any other type of information. In some examples, the user interface 130 may present a summary of reasons why the dump event was identified as a suspected false dump event, for instance based on which predefined or user-defined rule indicated that the dump event is a suspected false dump event.

The user can provide user input that either confirms that the selected dump event is a false dump event or that indicates that the selected dump event is not a false dump event. In some examples, the user may provide other input, such as text input, that explains reasons why the user determined that the selected dump event was or was not a false dump event. Such user-provided input can, in some examples, be used as feedback to adjust the rules manually or via computer-implemented systems that process the user-provided input. For example, natural language processing systems may interpret a user's text input describing reasons why a selected dump event was not a false dump event, which the worksite tracking system 106 can use to adjust the rules to decrease the chances of similar dump events being interpreted as false dump events in the future.

If the user confirms that an identified suspected false dump event is a false dump event, the false dump event suppressor 114 can suppress the user-confirmed false dump event. For example, the worksite tracking system 106 can update the tracking data 112 to reflect that the false dump event did not occur, by removing information about the false dump event and using sensor data 110 associated with operations of the machine 102 before, during, and after the false dump event to re-determine which operations the machine 102 was performing during those times.

However, the user may instead indicate that a selected dump event, identified by the false dump event suppressor 114 as a suspected false dump event, is not actually a false dump event. For example, a predefined or user-defined rule may have caused the false dump event suppressor 114 to identify a detected dump event as a suspected false dump event because the dump event occurred outside of an unloading area 128 that was defined in map data maintained by the worksite tracking system 106. However, the map data may be outdated, and an operator of the machine 102 may have been instructed to dump material 104 at a new unloading area 128 that was not previously defined in the map data. In this situation, the false dump event suppressor 114 may identify the detected dump event as a suspected false dump event, but user input may confirm that the detected dump event did actually occur and is not a false dump event. Accordingly, the user input can cause the false dump event suppressor 114 to not suppress the detected dump event, such that the tracking data 112 continues to reflect that the detected dump event occurred. The user may, in some examples, also choose to provide other input that updates the map data maintained by the worksite tracking system 106 to define the new unloading area 128, such that other dump events that have occurred and/or will occur at the new unloading area 128 are not identified by the false dump event suppressor 114 as suspected false dump events.

As discussed above, in some examples the false dump event suppressor 114 can be configured to use defined rules to identify suspected false dump events, and/or suppress the suspected false dump events or other user-selected false dump events if user input confirms that user-selected dump events are false dump events. However, in other examples, the false dump event suppressor 114 can also, or alternately, identify and suppress false dump events without requesting or receiving user input.

For example, the false dump event suppressor 114 can be, or be associated with, a machine learning model that is configured to make predictions indicating when detected dump events indicated by tracking data are likely to actually be false dump events. The machine learning model can, for instance, use the tracking data 112, the sensor data 110, and/or other information associated with a detected dump event to predict whether the detected dump event is a false dump event. If the machine learning model predicts that a detected dump event is a false dump event, the false dump event suppressor 114 can suppress the detected dump event and cause the worksite tracking system 106 to update the tracking data 112 to reflect that the detected dump event did not occur.

In some examples, the machine learning model associated with the false dump event suppressor 114 can operate based at least in part on tracking data 112 that has already been updated based on detection of a dump event by the event detector 108. For example, when the machine learning model predicts than an already-detected dump event likely did not occur, the false dump event suppressor 114 can suppress the predicted false dump event and cause the tracking data 112 to be retroactively corrected and updated to reflect that the false dump event did not occur. In other examples, the machine learning model associated with the false dump event suppressor 114 can operate as part or, or in conjunction with, the event detector 108. Accordingly, even if a dump switch signal or other sensor data 110 would otherwise cause the event detector 108 to detect a dump event and cause the worksite tracking system 106 to update tracking data 112 based on the detected dump event, the false dump event suppressor 114 can prevent the event detector 108 from detecting the dump event and prevent corresponding updates to the tracking data 112 if the machine learning model predicts that the dump event likely did not occur.

The machine learning model associated with the false dump event suppressor 114 can be based on convolutional neural networks, fully-connected neural networks, other types of neural networks, nearest-neighbor algorithms, regression analysis, deep learning algorithms, Gradient Boosted Machines (GBMs), Random Forest algorithms, and/or other types of artificial intelligence or machine learning frameworks. The machine learning model can be trained, for instance using supervised machine learning or semi-supervised machine learning, on a training data set.

The training data set can, for example, include an example set of tracking data that indicates identified dump events, sensor data associated with the identified dump events, and/or other information associated with machine and/or worksite operations that correspond with the identified dump events. The training data set can also be labeled, for instance based on user input, to indicate which of the dump events indicated in the training data set are real dump events that should not be suppressed and which are false dump events that should be suppressed. The machine learning model can be trained to determine which features in the training data set, such as which data types and/or values in the training data set, and/or which combinations of features, are predictive of corresponding dump events being labeled as false dump events. Accordingly, after being trained, the machine learning model can identify and use instances of those predictive features that are indicated by new sensor data 110, new tracking data 112, and/or other new data associated with new dump events detected by the event detector 108 to predict whether the new dump events are likely to be false dump events that should be suppressed.

In some examples, the training data set can be based on a historical set of operations at a worksite, such as based on historical tracking data 112 reflecting actual operations of one or more machines and/or corresponding dump events associated with those machines. As an example, a human expert may have analyzed the historical tracking data 112 to determine which detected dump events indicated in the historical tracking data 112 were actually false dump events, and labeled those dump events as being false within the training data set. As another example, an instance of the false dump event suppressor 114 may have previously used a set of defined rules to identify suspected false dump events as discussed above, and user input from users of the worksite tracking system 106 via the user interface 130 can have indicated that the suspected false dump events were indeed false dump events or were not false dump events. In this example, the training data set can be additionally or alternately labeled to indicate which dump events are false dump events based on user input provided in response to identification of suspected false dump events based on predefined rules.

In these examples, supervised learning algorithms can be used to, for instance, determine weights for different data features and/or different combinations of data features from the training data set that optimize prediction of whether corresponding dump events are actually false dump events that should be suppressed. As an example, machine learning algorithms can detect which combinations of data features in the training data set are statistically most relevant to predicting that a dump event is a false dump event, and/or determine weights for different data features, and can thus prioritize and/or weight the data features in relative relation to each other. The features, patterns of features and/or relationships between features, corresponding weights, and/or other information determined via the training of the machine learning model may accordingly allow the false dump event suppressor 114 to determine which information in sensor data 110, tracking data 112, and/or other information is predictive of false dump events, without using or relying on predetermined rules defined by human users.

After being trained, the machine learning model associated with the false dump event suppressor 114 can evaluate tracking data 112 that has been updated based on detection of a dump event by the event detector 108, in some examples in conjunction with corresponding sensor data 110 and/or other information, to determine whether the detected dump event is likely to be a false dump event. If the machine learning model associated with the false dump event suppressor 114 predicts that the detected dump event is likely to be a false dump event, the false dump event suppressor 114 may suppress the false dump event, and cause the worksite tracking system 106 to update the tracking data 112 to reflect that the false dump event did not occur.

In some examples, the false dump event suppressor 114 can suppress a dump event if the machine learning model predicts that the dump event is a false dump event with at least a threshold level of confidence. However, if a confidence level of a prediction of a false dump event made by the machine learning model is less than the threshold level of confidence, the false dump event suppressor 114 may cause the user interface 130 to display a representation of the false dump event in the user interface 130 indicating that the false dump event is a suspected false dump event. Accordingly, as discussed above, a user can use the user interface 130 to provide user input confirming that the suspected false dump event is a false dump event that is to be suppressed, or indicating that the suspected false dump event is not a false dump event and should not be suppressed.

Predictions generated by the machine learning model may be associated with corresponding confidence levels. As an example, the machine learning model may generate a prediction indicating that a first dump event is 90% likely to be a false dump event, such that the first prediction has a 90% confidence level. Accordingly, in some examples, dump events can be considered to be false dump events, or at least suspected false dump events, if the machine learning model predicts with at least a minimum threshold confidence level that the dump events are false dump events.

In some examples, the false dump event suppressor 114 may suppress false dump events that are predicted with a confidence level at or above a threshold confidence level without requesting or receiving user input, but display corresponding notifications via the user interface 130 such that a user may optionally review and/or reverse the suppressions of the predicted false dump events. In these examples, the false dump event suppressor 114 may avoid suppressing false dump events without user input if the false dump events are predicted with a confidence level that is above a minimum confidence level, but is less than a higher threshold confidence level associated with suppression of false dump events without user input. Accordingly, if the machine learning model predicts false dump events with confidence levels above the minimum confidence level and below the higher confidence level associated with suppression of false dump events without user input, the false dump event suppressor 114 can prompt users to manually review the predicted false dump events as suspected false dump events.

In examples in which users provide feedback on false dump events predicted by the machine learning model associated with the false dump event suppressor 114, for instance by providing user input that confirms that false dump events predicted by the machine learning model are indeed false dump events or that indicates that false dump events predicted by the machine learning model are not false dump events, the user feedback may be used to re-train the machine learning model. For example, initial training of the machine learning model may cause the machine learning model to determine that a particular combination of factors indicates that detected false dump events are false dump events. Accordingly, if the machine learning model determines that the same or a similar combination of factors are associated with a new dump event that has been detected, the machine learning model may predict that the new dump event is a false dump event. However, user feedback may indicate that the predicted false dump event was actually a real dump event.

Such user feedback may be used to re-train the machine learning model, for instance to lower or otherwise change weights associated with one or more of the factors the machine learning model had previously determined were indicative of false dump events. Similarly, if the user provides text input or other input indicating reasons why the user determined that a suspected false dump event is or is not a false dump event, the worksite tracking system 106 can use natural language processing or other systems to interpret the user input. The interpreted user input indicating reasons why the suspected false dump event was or was not actually a false dump event can also be used to retrain the machine learning model to consider those reasons and/or data associated with those reasons. Accordingly, as the machine learning model is used to make predictions, and corresponding user feedback on the predictions is used to re-train the machine learning model, the accuracy of predictions of false dump events made by the machine learning model can improve over time.

Overall, when the false dump event suppressor 114 uses predefined rules, user input, and/or a machine learning model to determine that a detected dump event indicated in tracking data 112 is a false dump event that was erroneously detected, the false dump event suppressor 114 can suppress information about the false dump event and cause the worksite tracking system 106 to update the tracking data 112 to reflect that that the false dump event did not occur. For example, the worksite tracking system 106 may decrement a count of dump events that have occurred at the worksite 100, and adjust information about one or more work cycles that was previously determined at least in part based on the detection of the dump event that has now been determined to have been a false dump event. An example of tracking data 112 being updated in association with suppression of a false dump event is discussed further below with respect to FIG. 2.

Figure 2:
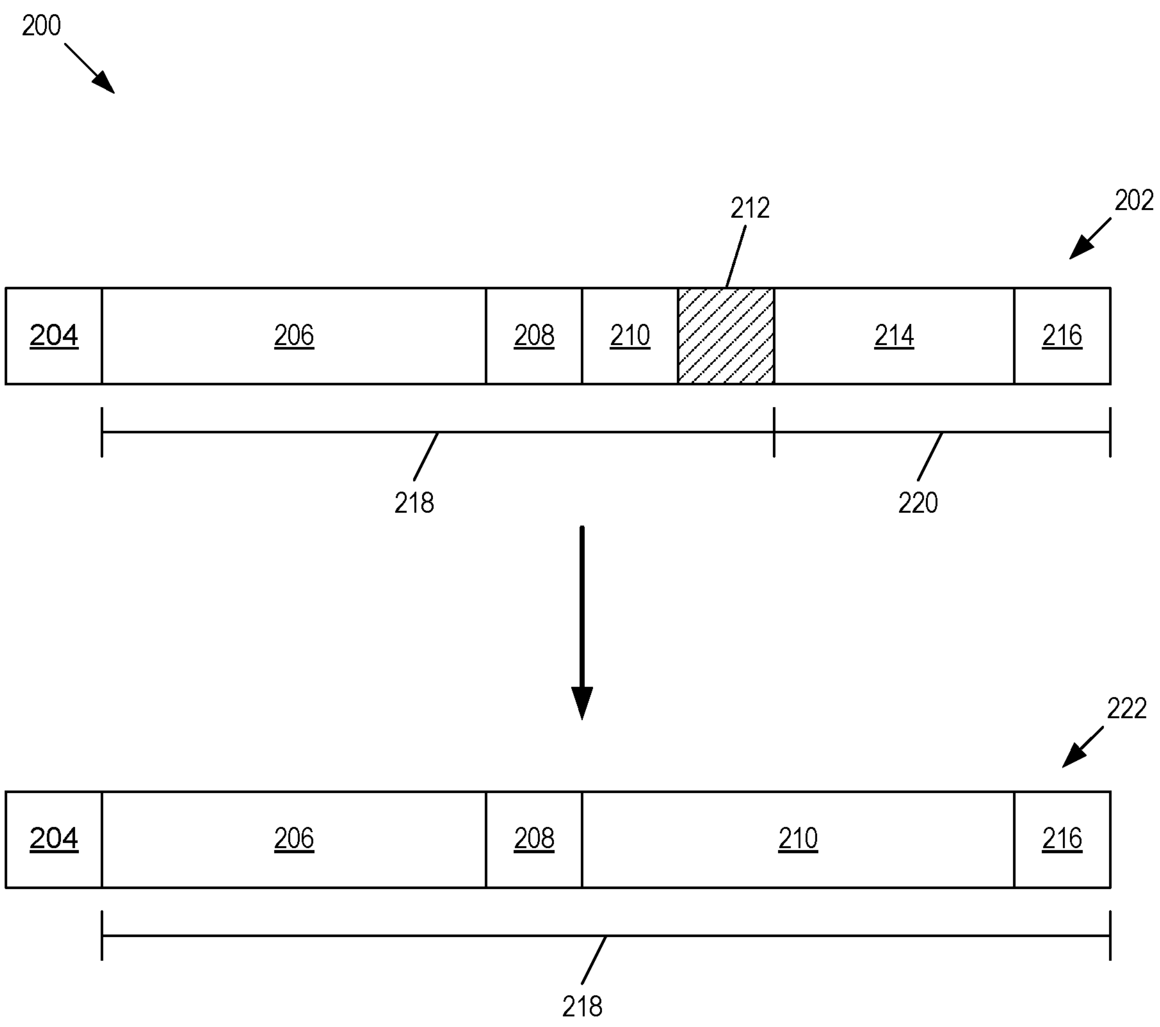
FIG. 2 shows an example of updating tracking data based on suppression of a false dump event.

FIG. 2 shows an example 200 of updating tracking data 112 based on suppression of a false dump event. As discussed above, the tracking data 112 may be updated based on events that are detected by the event detector 108 based on sensor data 110, such as detected dump events. However, in some situations the sensor data 110 may be inaccurate and/or otherwise cause the event detector 108 to erroneously determine that a dump event has occurred. Accordingly, a false dump event may be detected by the event detector 108, and cause the tracking data 112 to erroneously indicate that the false dump event occurred. The tracking data 112 can indicate, and/or be presented within the user interface 130 as, a timeline as shown in FIG. 2.

For instance, a first timeline 202 of events associated with machine 102 can be generated based on events that the event detector 108 detected using sensor data 110 associated with machine 102. The first timeline 202 can indicate that, in sequence, the machine 102 engaged in dump event 204, engaged in unloaded travel 206, engaged in loading event 208, engaged in loaded travel 210, engaged in dump event 212, engaged in additional travel 214, and engaged in dump event 216. However, in example 200, the dump event 212 was erroneously detected by the event detector 108, and did not actually occur.

However, the erroneous detection of dump event 212 may have caused the first timeline 202 to be inaccurate. For example, the worksite tracking system 106 may be configured to identify instances of work cycles that have an unloaded travel segment, a loading segment, a loaded travel segment, and an unloading event, and to determine that a work cycle has completed when a dump event is detected that indicates the occurrence of the unloading event. The worksite tracking system 106 may also be configured to, upon detection of a dump event, interpret sensor data 110 associated with previous and/or subsequent operations to determine classifications, durations, and/or other information associated with segments of the work cycle that ended based on the detected dump event and/or the next work cycle that began after the detected dump event.

Accordingly, due to the erroneously-detected dump event 212, the first timeline 202 may inaccurately indicate that a first work cycle 218 started with the unloaded travel 206 following the dump event 204 and ended with dump event 212, and a second work cycle 220 began after dump event 212 and ended with the next detected dump event 216. In some examples, the worksite tracking system 106 may have determined that the additional travel 214 at the beginning of the second work cycle 220 was loaded travel due to weight sensors still indicating that the machine 102 was carrying material 104 despite erroneous detection of dump event 212. However, in other examples, the worksite tracking system 106 may have determined that the additional travel 214 at the beginning of the second work cycle 220 was unloaded travel due to the erroneous detection of dump event 212 indicating that the machine 102 dumped material 104 immediately before beginning the additional travel 214. Accordingly, overall, the information about the second work cycle 220 can be inaccurate in one or more ways due to the erroneous detection of dump event 212.

However, as discussed above, the false dump event suppressor 114 can determine, via rules, user input, and/or a machine learning model, that dump event 212 is a false dump event that did not actually occur, such that information associated with dump event 212 should be suppressed. The false dump event suppressor 114 can accordingly cause the worksite tracking system 106 to update the tracking data 112 to remove references to dump event 212, decrement a count of dump events based on the suppression of dump event 212, adjust or re-determine information associated with one or more work cycles based on the suppression of dump event 212, and/or otherwise adjust or re-determine the tracking data 112 to indicate that dump event 212 did not occur.

For example, based on determination by the false dump event suppressor 114 that dump event 212 is a false dump event that did not occur and should be suppressed, the worksite tracking system 106 can revise the first timeline 202 into a second timeline 222 that omits references to dump event 212, that indicates that the first work cycle 218 began with unloaded travel 206 and ended with dump event 216, and that deletes and/or omits information associated with the second work cycle 220. For example, the worksite tracking system 106 may reevaluate sensor data 110 that had previously been associated with the unloaded travel 206, the loading event 208, the loaded travel 210, the dump event 212, the additional travel 214, and/or the dump event 216. Based on the determination that dump event 212 did not actually occur, the worksite tracking system 106 can re-interpret the sensor data 110 as indicating that the same sensor data 110 actually indicates the operations represented on the second timeline 222.

Accordingly, the second timeline 222 can be a corrected version of the first timeline 202 in the tracking data 112 that reflects that dump event 212 did not occur. The second timeline 222 can also be a corrected version of the first timeline 202 in the tracking data 112 that indicates that the first work cycle 218 was, in sequence, associated with unloaded travel 206 following dump event 204, unloaded travel 206, loading event 208, loaded travel 210, and dump event 216. In this situation, sensor data 110 and/or previous tracking data 112 associated with erroneously-detected dump event 212 and/or the additional travel 214 previously determined to have followed erroneously-detected dump event 212 can be incorporated into, and/or be used to update, information associated with loaded travel 210 in the second timeline 222.

Overall, by detecting that dump event 212 was a false dump event that did not occur, the inaccurate first timeline 202 initially indicated by the tracking data 112 maintained by worksite tracking system 106 can be retroactively corrected into the second timeline 222 that does not indicate that dump event 212 occurred. Examples of detection and suppression of a false dump event, such as dump event 212, based on user input are discussed further below with respect to FIG. 3 and FIG. 4. In other examples, a false dump event, such as dump event 212, can be detected and suppressed based at least in part on a machine learning model, as discussed further below with respect to FIG. 5 and FIG. 6.

Figure 3:
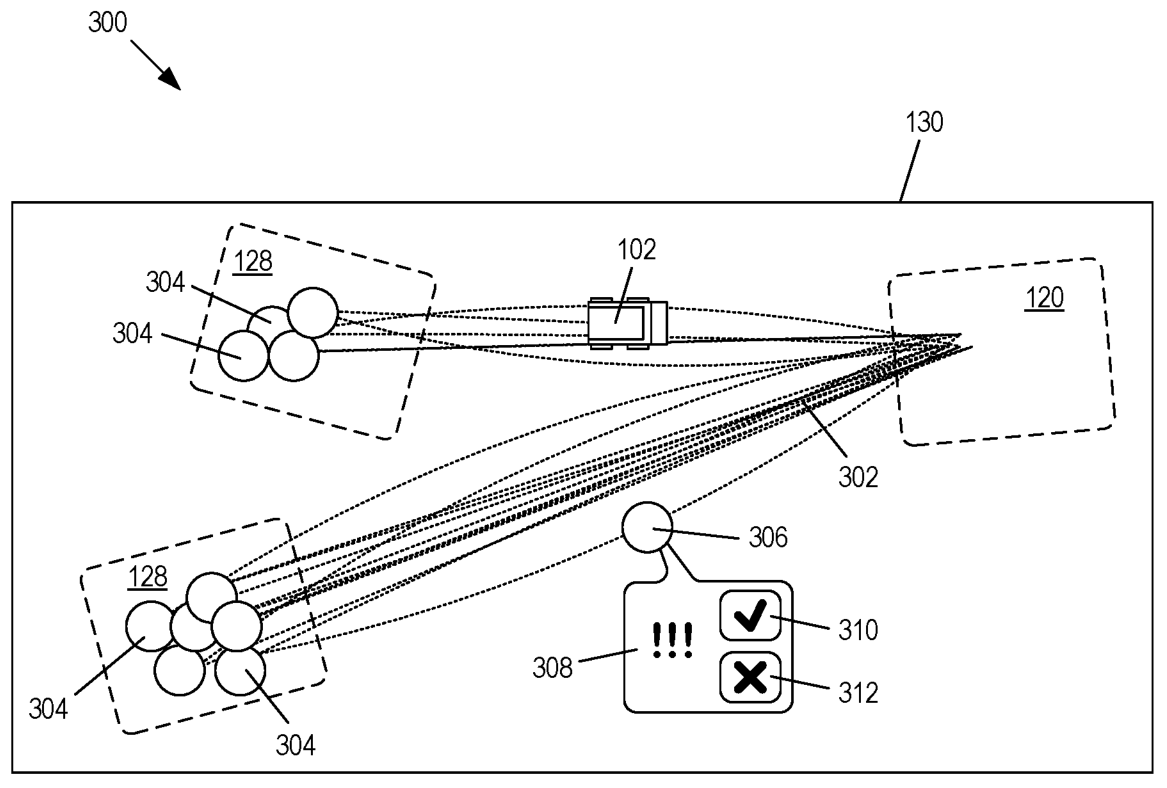
FIG. 3 shows an example of a user interface of a worksite tracking system.

FIG. 3 shows an example 300 of the user interface 130 of the worksite tracking system 106. The user interface 130 can display representations of events that, based on corresponding tracking data 112, have been detected to have occurred at the worksite 100. For example, as shown in FIG. 3, the user interface 130 can display visual representations of detected events, for instance overlaid over a map of the worksite 100. The map displayed in the user interface 130 can indicate, for example a current location of the machine 102, travel paths 302 of previous movements of the machine 102 across the worksite 100, locations of loading areas 120 and unloading areas 128 that have been defined by users or identified based on clusters of identified events, locations of identified dump events 304 and/or other identified events, and/or other information associated with identified events or other operations at the worksite 100.

As shown in FIG. 3, the user interface 130 can display a representation of a suspected false dump event 306 via a user interface element 308, such as a pop-up notification, flagged or highlighted representation of a corresponding dump event on a map or list, or other type of user interface element. As described above, in some examples the false dump event suppressor 114 may identify a suspected false dump event based on predefined and/or user defined rules. Accordingly, if the false dump event suppressor 114 determines that a dump event is a suspected false dump event, the false dump event suppressor 114 can cause the suspected false dump event to be presented to a user via the user interface element 308 as shown in FIG. 3. In other examples, a machine learning model associated with the false dump event suppressor 114 may predict that a dump event is likely a false dump event with a confidence level that is above a minimum confidence level sufficient to indicate that that the dump event is a suspected false dump event, but below a higher threshold confidence level at which the false dump event suppressor 114 may be configured to suppress the false dump event without requesting or receiving user input. Accordingly, in such examples in which the machine learning model determines that the dump event is a suspected false dump event, the false dump event suppressor 114 can cause the suspected false dump event to be presented to a user via the user interface element 308 as shown in FIG. 3.

A user may select the user interface element 308 via the user interface 130 to view more details about the detected dump event, such as more information about the time of the detected dump event, a location of the detected dump event, the machine that was determined to perform the detected dump event, a type and/or amount of material 104 that was determined to be have been dumped during the detected dump event, and/or any other information about the detected dump event that is indicated in the tracking data 112. The user may select a keep option 310 via the user interface element 308, or provide other user input, to indicate that the detected dump event is a real dump event that should not be suppressed. However, if the user instead determines that the detected dump event is a false dump event and was erroneously detected, the user may instead select a suppress option 312 via the user interface element 308, or provide other user input, to indicate that the detected dump event is a false dump event that should be suppressed.

Accordingly, if the user selects the suppress option 312 in association with a detected dump event, the worksite tracking system 106 can update the tracking data 112 to remove and/or omit references to the detected dump event, for example as discussed above with respect to FIG. 2. Accordingly, when user input confirms that a selected dump event did not occur via the suppress option 312 or other user input, some or all of the tracking data 112 can be re-determined or otherwise updated to reflect that the selected dump event did not occur. In some examples, user input provided via the keep option 310 and/or the suppress option 312 in association with selected dump events can also be used to train and/or re-train a machine learning model associated with the false dump event suppressor 114, as described herein.

FIG. 3 shows the user interface element 308 being displayed in association with a suspected false dump event that is determined by the false dump event suppressor 114 based on defined rules or a machine learning model. However, the user interface 130 can also, or alternately, be configured to allow a user to select a representation of any detected dump event, and be presented with the same or a similar user interface element 308 that allows the user to review more details about the selected dump event and/or provide user input that either confirms that the selected dump event occurred or is a false dump event that did not occur. Accordingly, if a user suspects that a detected dump event shown in the user interface 130 did not occur, the user can select the dump event and provide user input to indicate that the detected dump event did not occur and should be suppressed such that the tracking data 112 is updated, even if the false dump event suppressor 114 did not identify the user-selected dump event as a suspected false dump event. In some examples, such user input associated with user-identified false dump events can be used to train and/or re-train a machine learning model associated with the false dump event suppressor 114, as described herein. An example of a detected dump event being identified as a suspected false dump event, and/or a user providing user input via the user interface 130 to indicate that a dump event is or is not a false dump event, is discussed further below with respect to FIG. 4.

Figure 4:
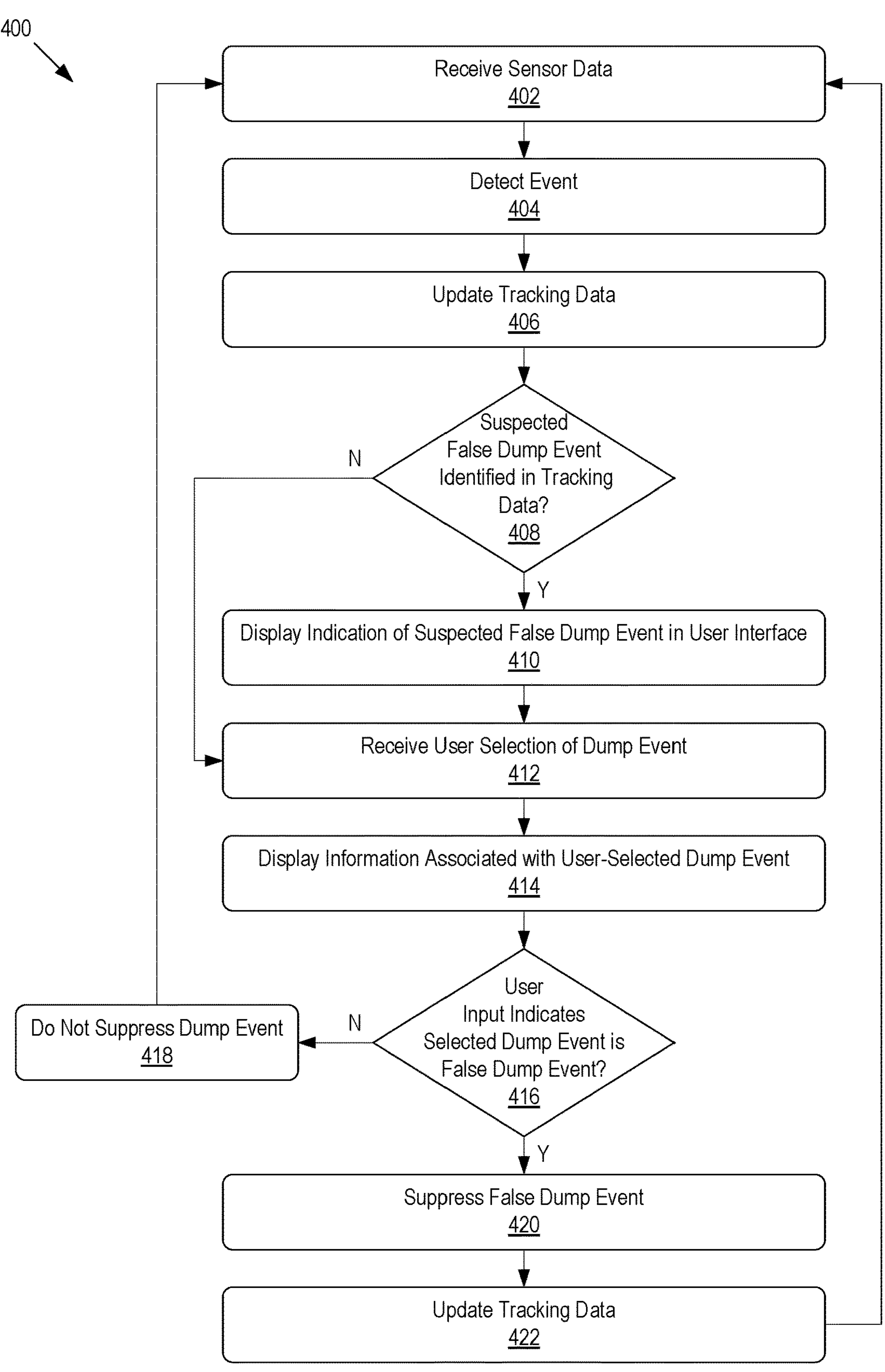
FIG. 4 is a flowchart illustrating an exemplary process for identifying and suppressing information associated with a false dump event that has been erroneously detected.
Figure 7:
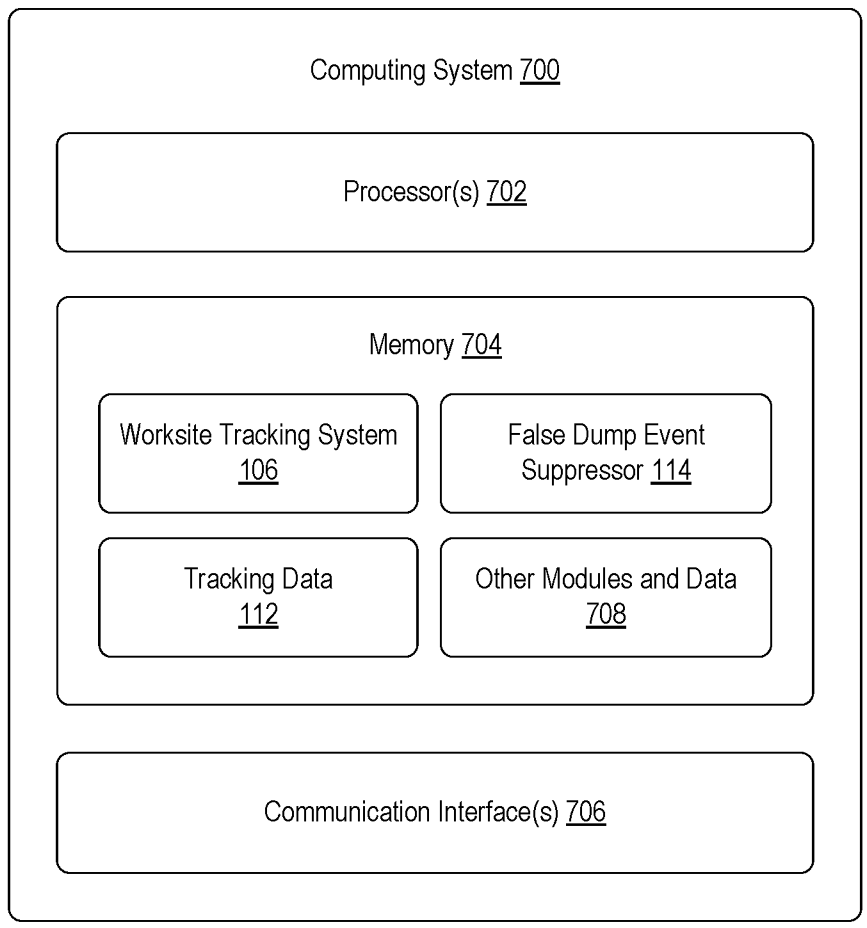
FIG. 7 is a schematic illustration depicting an exemplary architecture of a computing system.

FIG. 4 is a flowchart 400 illustrating an exemplary process for identifying and suppressing information associated with a false dump event that has been erroneously detected. The operations shown in FIG. 4 can be performed by one or more computing systems, such as a computing system that executes the false dump event suppressor 114 and/or other elements associated with the worksite tracking system 106. FIG. 7, discussed further below, describes an example system architecture for such a computing system.

At block 402, the computing system can receive sensor data 110 associated with operations of the machine 102. The machine 102 can have one or more sensors 132 that capture and/or collect one or more types of sensor data 110, and wireless communication interfaces 134 of the machine 102 can transmit the sensor data 110 to the computing system, such that the computing system receives the sensor data 110 at block 402.

At block 404, the computing system can detect the occurrence of an event, such as a dump event or another event associated with a work cycle, based on the sensor data 110 received at block 402. For example, if the sensor data 110 includes data captured by a dump switch sensor of the machine 102, an instance of the event detector 108 executed by the computing system may determine that the sensor data 110 from the dump switch sensor indicates that the machine 102 engaged in a dump event to dump a load of material 104.

At block 406, the computing system can update the tracking data 112 based at least in part on the event that was detected at block 404. For example, if the detected event was a dump event, the computing system can update the tracking data 112 to increment a count of dump events that have occurred at the worksite 100, indicate that one work cycle associated with the machine 102 ended upon the completion of the detected dump event, that another work cycle associated with the machine 102 began following the detected dump event, indicate that a load of material has been dumped and is now present at the location of the detected dump event, and/or otherwise updated the tracking data 112 based on the detection of the dump event.

At block 408, the computing system can determine whether a suspected false dump event is identified in the tracking data 112. As noted above, the tracking data 112 can have been updated based on one or more detected events, such as based on the update that occurred at block 406 and/or based on one or more previous updates. Accordingly, the false dump event suppressor 114 can determine whether any of the detected dump events indicated by the tracking data 112 is a suspected false dump event.

In some examples, the false dump event suppressor 114 can use one or more predefined rules and/or user-defined rules to identify a suspected false dump event indicated by the tracking data 112. For example, the false dump event suppressor 114 may determine that a detected dump event indicated by the tracking data 112 is a suspected dump event at block 408 because one or more attributes of the dump event indicated by the tracking data 112 satisfies one or more conditions of a predefined rule or a user-defined rule configured by a user of the worksite tracking system 106.

In other examples, the false dump event suppressor 114 can use a machine learning model to identify that a detected dump event is a suspected false dump event. The machine learning model may be configured such that predictions of false dump events that have confidence levels at or above a first threshold level can be suppressed without being confirmed as false dump events via user input, but that other predictions of false dump events that have lower confidence levels above a lower second threshold level are considered suspected false dump events that are to be reviewed manually. Accordingly, if the machine learning model predicts that a detected dump event is likely to be a false dump event with a confidence level above the second threshold level to be considered a suspected false dump event, but below the first threshold level to be suppressed without user confirmation, the false dump event suppressor 114 can determine that the dump event is a suspected dump event at block 408.

If the computing system determines that a suspected false dump event is identified in the tracking data 112 (Block 408—Yes), the computing system can cause an indication of the suspected false dump event to be displayed via the user interface 130 at block 410. For example, the suspected false dump event can be displayed in association with a user interface element 308 that highlights the suspected false dump event and/or that prompts a user to review the suspected false dump event, as shown in FIG. 3. The computing system may cause the user interface 130 to display representations of other-detected dump events, in addition to a representation of the suspected false dump event. If the computing system instead determines that the tracking data 112 does not indicate a suspected false dump event (Block 408—No), the computing system can cause the user interface 130 to display representations of detected dump events without noting that any of the detected dump events are suspected false dump events.

At block 412, the computing system can receive a user selection of a dump event via the user interface 130. As discussed above, the user interface 130 can display representations of detected dump events indicated by the tracking data 112, including representations of any suspected false dump events that have been identified by the false dump event suppressor 114. Accordingly, a user may use the user interface 130 to select a representation of a suspected false dump event or a representation of any other detected dump event at block 412.

At block 414, the computing system can cause the user interface 130 to display information associated with the dump event selected at block 412. For example, the user interface 130 can display information about the time of the selected dump event, the location of the selected dump event, sensor data 110 associated with the selected dump event, work cycle information associated with the selected dump event in the tracking data 112, an identifier of the machine associated with the selected dump event, material tracking information associated with the selected dump event, and/or any other information. The user interface 130 may also display instances of the keep option 310 and/or the suppress option 312, as shown in FIG. 3, in association with the selected dump event.

At block 416, the computing system can determine whether user input received in association with the dump event selected at block 412 indicates that that the dump event is a false dump event that is to be suppressed. For example, a user may select the keep option 310 to indicate that the selected dump event is not a false dump event, or select the suppress option 312 to indicate that the selected dump event is a false dump event that should be suppressed.

If user input indicates that the selected dump event is not a false dump event (Block 416—No), the computing system can determine not to suppress the dump event at block 418. Accordingly, the tracking data 112 can continue to reflect the occurrence of the dump event. The computing system may return to block 402 to receive new sensor data 110, return to block 408 to attempt to identify suspected dump events, return to block 412 to receive a user selection of another dump event, and/or perform other operations.

However, if user input indicates that the selected dump event is a false dump event (Block 416—Yes), the computing system can determine to suppress the dump event at block 420. Accordingly, the computing system can update the tracking data 112 at block 422 to reflect that the detected dump event did not occur, for instance by decrementing a count of dump events that have that occurred, adjusting material tracking data to indicate that material was not dumped via the detected dump event, adjusting work cycle information to omit references to the detected dump event by adjusting event identifications and durations of segments of one or more work cycles that had previously been determined to begin or end with the detected dump event, and/or by otherwise adjusting or re-determining one or more types of tracking data 112. After updating the tracking data 112 at block 422, the computing system may return to block 402 to receive new sensor data 110, return to block 408 to attempt to identify suspected dump events, return to block 412 to receive a user selection of another dump event, and/or perform other operations.

As discussed above with respect to block 408 of FIG. 4, in some examples a suspected false dump event can be identified via a machine learning model associated with the false dump event suppressor 114. Training of such a machine learning model is discussed further below with respect to FIG. 5.

Figure 5:
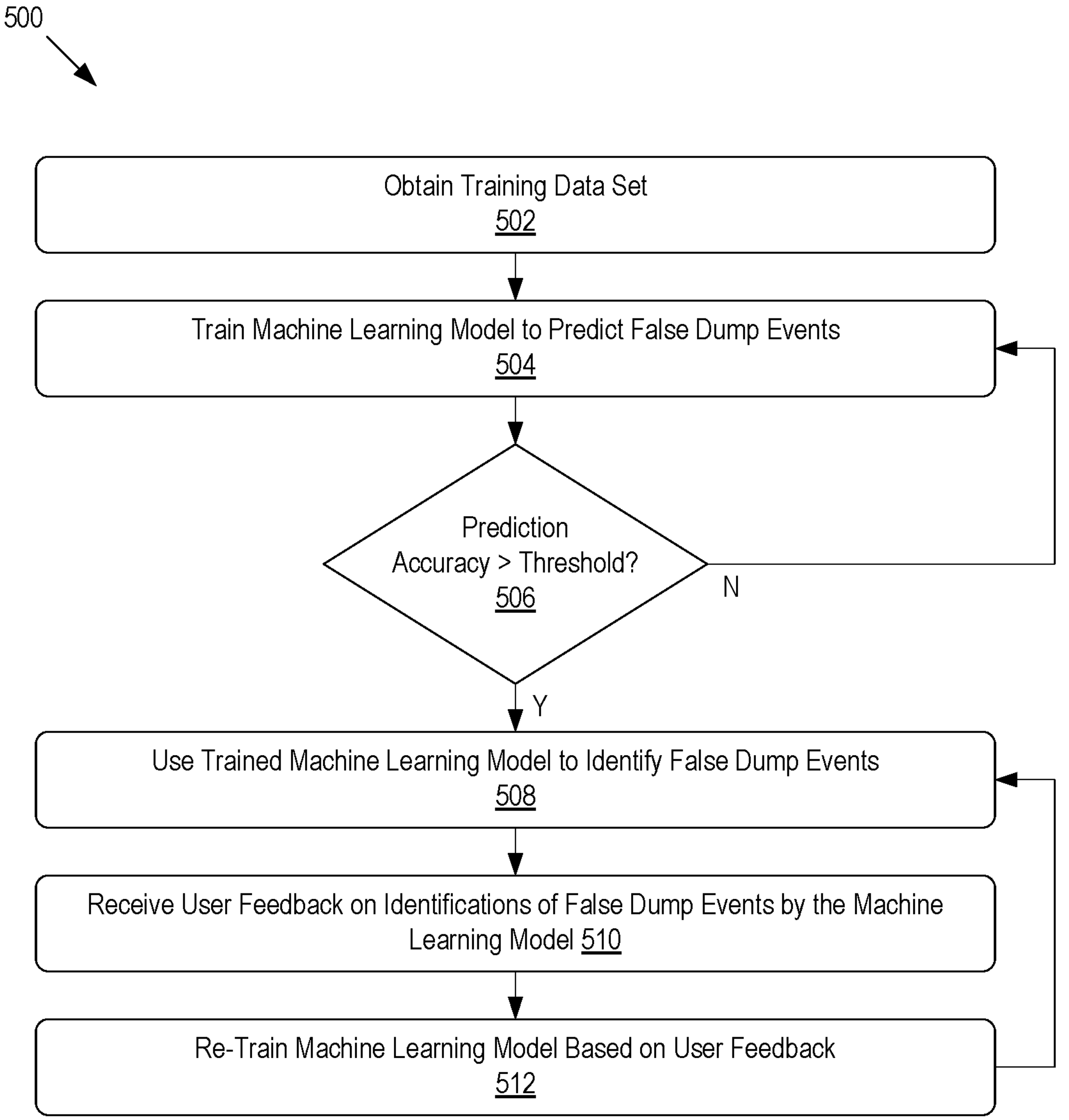
FIG. 5 is a flowchart illustrating an exemplary process for training a machine learning model associated with a false dump event suppressor.

FIG. 5 is a flowchart 500 illustrating an exemplary process for training a machine learning model associated with the false dump event suppressor 114. The operations shown in FIG. 5 can be performed by one or more computing systems, such as a computing system that executes the false dump event suppressor 114 and/or other elements associated with the worksite tracking system 106. FIG. 7, discussed further below, describes an example system architecture for such a computing system.

At block 502, the computing system can obtain a training data set. The training data set can, in some examples, include example sensor data 110 corresponding indications of dump events associated with the example sensor data 110. The training data set can also be labeled to indicate which of the indicated dump events have been determined, by one or more experts and/or users of the worksite tracking system 106, to be false dump events.

At block 504, the computing system can train the machine learning model based on the training data set to predict the false dump events indicated in the training data set. For example, the machine learning model can be trained to determine which features in the training data set, such as which data types and/or values in the training data set, and/or which combinations of features, are predictive of corresponding dump events being labeled as false dump events. The machine learning model can also be trained to identify weights associated with the predictive features, to indicate which of the features have a higher correlation with, and/or are more predictive of, dump events being false dump events.

At block 506, the computing system can determine whether the training of the machine learning model enables the machine learning model to make predictions of false dump events at an accuracy level that is at or above an accuracy threshold. The accuracy level and accuracy threshold can be based on one or more types of scores and/or statistical metrics suitable for model evaluation, such as an accuracy score, a precision score, a recall score, an F1 score, and/or other metrics or scores. For example, the machine learning model may be trained on a first subset of the training data set at block 504, and then may be tested on a second subset of the training data set to determine whether the training based on the first subset is sufficient to allow the machine learning model to make accurate predictions of which dump events indicated in the second subset have been labeled as false dump events. If the computing system determines that the prediction accuracy of the machine learning model is not yet above the threshold (Block 506—No), the computing system can continue to train the machine learning model at block 504. For example, the computing system can continue to train the machine learning model, on the same training data set or additional training data, to further adjust weights, identify new or different predictive features, or otherwise adjust the machine learning model until the machine learning model is able to make predictions that are accurate to above the threshold accuracy level, the training of the machine learning model can be completed and the machine learning model can be deployed to be used by the false dump event suppressor 114.

For example, at block 508, the trained machine learning model can be used by the false dump event suppressor 114 to identify false dump events, from among dump events detected by the event detector 108. For example, based on instances of features, identified as being predictive of false dump events during the training of the machine learning model, that are present in tracking data 112, corresponding sensor data 110, and/or other information associated with detected dump events, the machine learning model can predict likelihoods of the detected dump events being false dump events. Accordingly, such predictions of false dump events identified by the trained machine learning model can be used to suppress the predicted false dump events and to update corresponding tracking data 112, and/or to present the predicted false dump events to users as suspected false dump events as described herein.

In some examples, at block 510 the computing system can receive user feedback regarding false dump events identified by the false dump event suppressor 114 via the machine learning model. For example, the user feedback can be received via the user interface 130, and/or may indicate whether users agreed or disagreed that the dump events identified as false by the machine learning model were false dump events.

At block 512, the computing system can re-train the machine learning model based on the user feedback received at block 510. For example, if the machine learning model predicted that a particular dump event was a false dump event, but user feedback indicated that the particular dump event was not a false dump event, the machine learning model can be trained based on sensor data and/or other information about the particular dump event to re-weight features, determine different combinations of features, and/or otherwise adjust the machine learning model to decrease the likelihood of the machine learning model predicting that the particular dump event and/or similar dump events are false dump events in the future. Similarly, if user input received via the user interface 130 indicated that a particular dump event, which the machine learning model had not predicted to be a false dump event, was actually a false dump event, the machine learning model can be adjusted to increase the likelihood that the of the machine learning model predicting that the particular dump event and/or similar dump events are false dump events in the future. The computing system can return to block 508 after re-training the machine leaning model, such that the re-trained machine learning model can be used by the false dump event suppressor 114 to identify false dump events, from among dump events detected by the event detector 108.

As discussed above, at block 508 the machine learning model can be used by the false dump event suppressor 114 to identify false dump events, from among dump events detected by the event detector 108. Examples of the machine learning model identifying false dump events are discussed further below with respect to FIG. 6.

Figure 6:
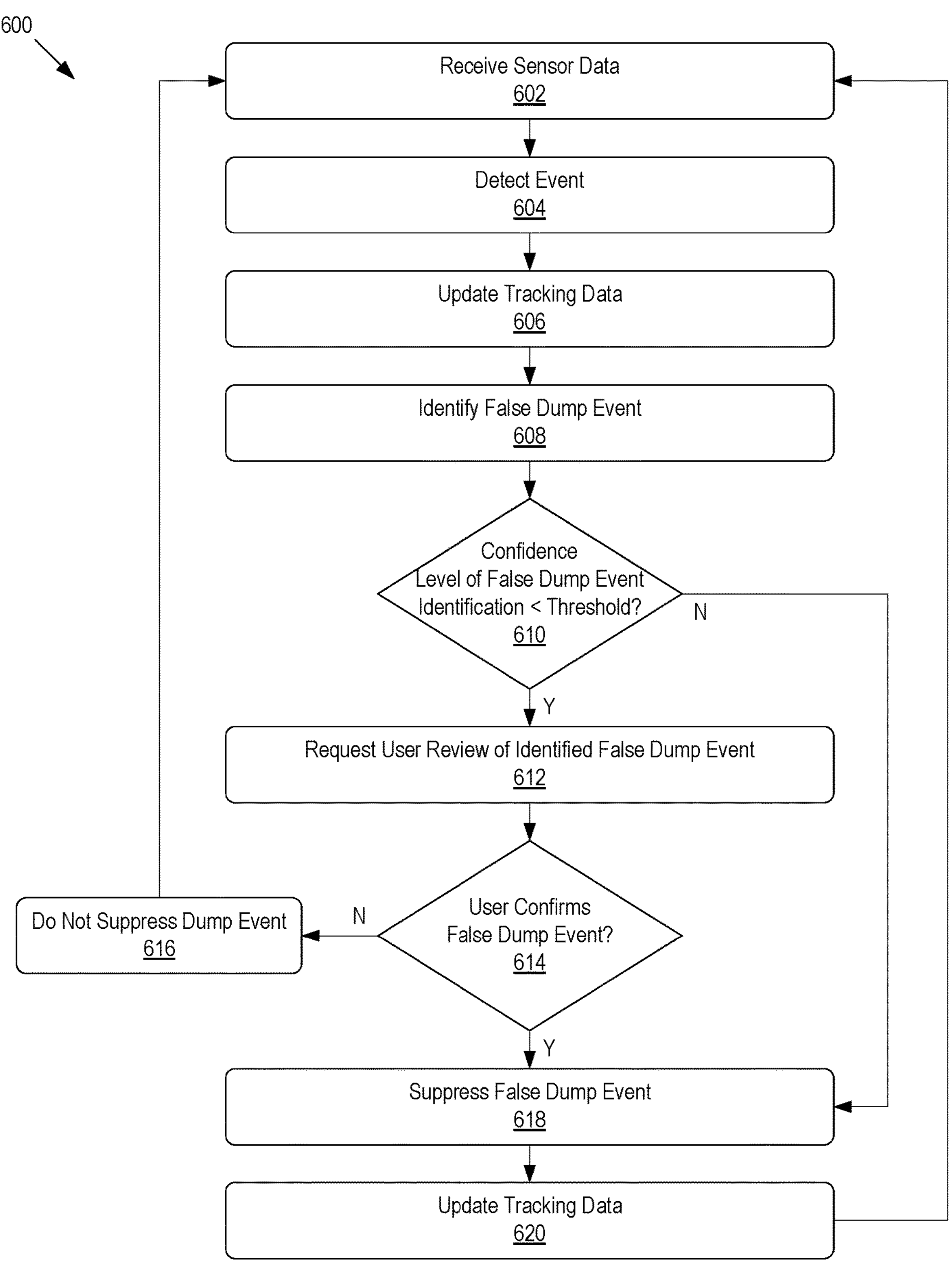
FIG. 6 is a flowchart illustrating an exemplary process for using a machine learning model to identify and suppress information associated with a false dump event that has been erroneously detected.

FIG. 6 is a flowchart 600 illustrating an exemplary process for using a machine learning model to identify and suppress information associated with a false dump event that has been erroneously detected. The operations shown in FIG. 6 can be performed by one or more computing systems, such as a computing system that executes the false dump event suppressor 114 and/or other elements associated with the worksite tracking system 106. FIG. 7, discussed further below, describes an example system architecture for such a computing system.

At block 602, the computing system can receive sensor data 110 associated with operations of the machine 102. The machine 102 can have one or more sensors 132 that capture and/or collect one or more types of sensor data 110, and wireless communication interfaces 134 of the machine 102 can transmit the sensor data 110 to the computing system, such that the computing system receives the sensor data 110 at block 602.

At block 604, the computing system can detect the occurrence of an event, such as a dump event or another event associated with a work cycle, based on the sensor data 110 received at block 602. For example, if the sensor data 110 includes data captured by a dump switch sensor of the machine 102, an instance of the event detector 108 executed by the computing system may determine that the sensor data 110 from the dump switch sensor indicates that the machine 102 engaged in a dump event to dump a load of material 104.

At block 606, the computing system can update the tracking data 112 based at least in part on the event that was detected at block 604. For example, if the detected event was a dump event, the computing system can update the tracking data 112 to increment a count of dump events that have occurred at the worksite 100, indicate that one work cycle associated with the machine 102 ended upon the completion of the detected dump event, that another work cycle associated with the machine 102 began following the detected dump event, indicate that a load of material has been dumped and is now present at the location of the detected dump event, and/or otherwise updated the tracking data 112 based on the detection of the dump event.

At block 606, the computing system can use a machine learning model associated with the false dump event suppressor 114 to determine that a dump event, that was detected by the event detector 108 and is indicated in the tracking data 112, is a false dump event. The machine learning model can previously have been trained and/or re-trained to identify predictive features within sensor data 110, tracking data 112, and/or other data that is predictive of a detected dump event being a false dump event that did not actually occur, as discussed above with respect to FIG. 5. For instance, the training of the machine learning model may have indicated that a certain combination of values, within sensor data 110 and/or tracking data 112 associated with a detected dump event, is likely to indicate that the detected dump event did not actually occur.

As a non-limiting example, a dump switch sensor may have indicated to the event detector 108 that a bed of a haul truck was raised in association with a dump event at a particular time, such that the event detector 108 detects the dump event and causes a corresponding update of the tracking data 112. However, training of the machine learning model may have indicated that although the sensor data 110 from the dump switch indicates that the bed was raised at the particular time, other sensor data 110 indicates the haul truck was traveling at a particular speed at the particular time and was relatively close to a loading area 120 where the machine 102 was most recently loaded with material 104, such that the machine learning model can predict that it was unlikely that a dump event occurred at the particular time despite the sensor data 110 from the dump switch sensor. For instance, the dump switch sensor may have been faulty and/or provided inaccurate sensor data 110. Accordingly, even though the event detector 108 detected an occurrence of a dump event and caused a corresponding update to the tracking data 112, the false dump event suppressor 114 can use the machine learning model to predict that the dump event detected by the event detector 108 was actually a false dump event that should be suppressed.

At block 610, the computing system can determine whether a confidence level of the false dump event that was identified at block 608 is less than a threshold confidence level associated with suppression of a false dump event without user confirmation. For example, the machine learning model may have predicted that a particular dump event that had been detected by the event detector 108 was actually a false dump event, but may have indicated a relatively low confidence level associated with that prediction.

Accordingly, if the confidence level of the identified false dump event is less than the threshold confidence level (Block 610—Yes), the computing system may request that a user of the worksite tracking system 106 review the identified false dump event at block 612 to confirm whether or not the identified false dump event was a false dump event. For example, the computing device can cause a representation of the identified false dump event to be displayed in the user interface 130, for instance as a suspected false dump event via a user interface element 308. At block 614, the computing system can determine whether user input received in association with the identified dump event confirms that that the identified dump event is a false dump event that is to be suppressed. For example, a user may select the keep option 310 via the user interface 130 to indicate that the identified dump event is not a false dump event, or select the suppress option 312 via the user interface 130 to indicate that the identified dump event is indeed a false dump event that should be suppressed.

If user input indicates that the identified dump event is not a false dump event (Block 614—No), the computing system can determine not to suppress the dump event at block 616. Accordingly, the tracking data 112 can continue to reflect the occurrence of the dump event. The computing system may return to block 602 to receive new sensor data 110, return to block 608 to identify another false dump event, re-train the machine learning model based on the user feedback indicating that the dump event identified as false by the machine learning model was not actually a false dump event, and/or perform other operations.

However, if the user input indicates that the identified dump event is a false dump event (Block 614—Yes), or if the confidence level of the identified false dump event is at or above the threshold confidence level (Block 610—Yes) such that a user is not prompted to review the identified dump event, the computing system can determine to suppress the dump event at block 618. Accordingly, the computing system can update the tracking data 112 at block 620 to reflect that the identified false dump event did not occur, for instance by decrementing a count of dump events that have that occurred, adjusting material tracking data to indicate that material was not dumped via the identified false dump event, adjusting work cycle information to omit references to the identified false dump event by adjusting event identifications and durations of segments of one or more work cycles that had previously been determined to begin or end with the identified false dump event, and/or by otherwise adjusting or re-determining one or more types of tracking data 112. After updating the tracking data 112 at block 620, the computing system may return to block 602 to receive new sensor data 110, return to block 608 to identify another false dump event, re-train the machine learning model based on user feedback indicating that the dump event identified as false by the machine learning model was actually a false dump event, and/or perform other operations.

FIG. 7 is a schematic illustration depicting an exemplary architecture of a computing system 700 that executes one or more elements described in the present disclosure. The computing system 700 can include one or more processors 702, memory 704, and communication interfaces 706.

The worksite tracking system 106 can be implemented by one or more instances of the computing system 700. For example, the computing system 700 can execute one or more elements of the worksite tracking system 106, such as the event detector 108, the false dump event suppressor 114, elements that cause the user interface 130 to be displayed via the computing system 700 or other computing systems, and/or other elements associated with the worksite tracking system 106. In some examples, the computing system 700 can be a local server or other local computing device that is physically present at or near the worksite 100. In other examples, the computing system 700 can be a remote server or other remote computing system that is located at a remote location relative to the worksite 100. For instance, the computing system 700 may be executed via a remote server, a cloud computing environment, or other computing system that is not present at the worksite 100.

In some examples, different elements associated with the worksite tracking system 106 may be distributed among, and/or be executed by, different instances of the computing system 700. As an example, a first instance of the computing system 700 may execute the event detector 108 to detect events and update corresponding tracking data 112 stored at the first instance of the computing system 700 or a separate data repository. A second instance of the computing system 700 may execute the false dump event suppressor 114 to identify and suppress false dump events that were erroneously detected by the event detector 108, and to cause corresponding updates to the tracking data 112 stored at the first instance of the computing system 700 or the separate data repository. As another example, a first instance of the computing system 700 may train and/or re-train a machine learning model associated with the false dump event suppressor 114 as described herein, while a trained version of the machine learning model can be deployed on a second instance of the computing system 700 that executes the false dump event suppressor 114 in association with a particular worksite.

The processor(s) 702 can operate to perform a variety of functions as set forth herein. The processor(s) 702 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 702 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 702 can also access content and computer-executable instructions stored in the memory 704, and execute such computer-executable instructions.

The memory 704 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 702 to perform the operations described herein.

For example, the memory 704 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 702 and/or communication interface(s) 706 during execution thereof by the computing system 700. For example, the processor(s) 702 can possess local memory, which also can store program modules, program data, and/or one or more operating systems.

The memory 704 can store data and/or computer-executable instructions associated with the worksite tracking system 106, including the false dump event suppressor 114 and tracking data 112 described herein. The data and/or computer-executable instructions associated with the worksite tracking system 106 can also include the event detector 108, elements that present the user interface 130, and/or other elements described herein. The memory 704 can also store other modules and data 708 that can be utilized by the computing system 700 to perform or enable performing any action taken by the computing system. For example, the other modules and data 708 can include a platform, operating system, and/or applications, as well as data utilized by the platform, operating system, and/or applications.

The communication interfaces 706 can include transceivers, modems, interfaces, antennas, and/or other components that can transmit and/or receive data over networks or other data connections. In some examples, the communication interfaces 706 can be wired communication interfaces and/or wireless communication interfaces that the computing system 700 can use to send and/or receive data. For example, the computing system 700 can use the communication interfaces 706 to receive sensor data 110 associated with the machine 102, transmit tracking data 112 to other computing systems, output reports and/or user interface elements to other computing devices, and/or otherwise exchange data via networks or other data connections.

INDUSTRIAL APPLICABILITY

As described herein, the worksite tracking system 106 is a computer-implemented system that can use sensor data 110 to detect events that have occurred at the worksite 100, and can generate and/or update tracking data 112 to reflect the occurrences of the detected events. For example, the worksite tracking system 106 can use provided sensor data 110 to detect the occurrence of dump events associated with dumping of material 104 at the worksite 100. Accordingly, when the occurrence of a dump event is detected based on sensor data 110, the worksite tracking system 106 can update the tracking data 112 to increment a count of dump events that have occurred, indicate that work cycles ended and began in association with the dump event, indicate that a type and/or amount of material 104 was delivered to a particular location via the dump event, and/or otherwise indicate information associated with operations at the worksite 100 that were impacted by the dump event.

However, in some situations, provided sensor data 110 may be erroneous, and/or cause the worksite tracking system 106 to erroneously determine that a dump event has occurred when no dump event actually occurred. Accordingly, erroneous detection of such false dump events can cause the tracking data 112 to be inaccurate, and for productivity metrics, material movement data, and/or other information determined based on the tracking data 112 to similarly be inaccurate.

However, the false dump event suppressor 114 can identify false dump events that are indicated by the tracking data 112 and were erroneously detected based on sensor data 110. Accordingly, information associated with such false dump events identified by the false dump event suppressor 114 can be suppressed and the tracking data 112 can be updated and/or re-determined to reflect that the false dump events did not occur. For example, the tracking data 112 can be updated to decrement a count of dump events that have occurred, indicate that work cycles did not end or began in association with an identified false dump event, indicate that a type and/or amount of material 104 previously associated with a false dump event was not dumped via the false dump event and instead may have been dumped at a different location and/or via a different dump event, and/or otherwise correct information associated with operations at the worksite 100 based on suppression of information associated with the identified false dump event.

Accordingly, the false dump event suppressor 114 can identify and suppress information associated with false dump events, such that the tracking data 112 can be retroactively updated and corrected to more accurately reflect actual operations that have occurred at the worksite 100. Accordingly, the updated tracking data 112 can provide a supervisor or manager associated with the worksite 100 with more accurate productivity metrics, such as a more accurate count of how many dump events occurred at the worksite during a particular period of time, a more accurate count of how many dump events a particular machine performed, and/or more accurate versions of other types of productivity metrics. The updated tracking data 112 can similarly provide a customer associated with the worksite 100 with more accurate records how much material 104 has been moved at the worksite 100, more accurate records of where material 104 is currently located at the worksite 100, more accurate records of types and/or amounts of material that have been dumped at the worksite 100, and/or more accurate versions of other types of material tracking data.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computer-implemented method comprising:

generating, by a computing system comprising a processor and memory storing instructions executable by the processor, a control signal that causes a machine, separate from the computing system, to perform a work cycle comprising a dump event;

receiving, by the computing system via a transmission from the machine, sensor data captured by one or more sensors of the machine, wherein the sensor data is indicative of operations of the machine at a worksite during performance of the work cycle in response to the control signal;

determining, by the computing system at a first time, that the sensor data indicates that the machine performed the dump event, during performance of the work cycle, at a particular time and at a particular location;

updating, by the computing system, tracking data associated with the worksite in response to determining that the sensor data indicates that the machine performed the dump event, wherein:

the tracking data is updated to indicate that a work cycle segment of the work cycle, performed by the machine, ended at the particular time and at the particular location based on the dump event;

determining, by the computing system at a second time, that the dump event was erroneously indicated by the sensor data and is a false dump event that did not occur; and suppressing, by the computing system, the false dump event by re-determining the tracking data based on determining that the dump event was erroneously indicated by the sensor data, wherein re-determining the tracking data comprises:

retroactively adjusting the tracking data to indicate that the work cycle segment did not end at the particular time and at the particular location.

2. The computer-implemented method of claim 1, comprising:

determining, by the computing system at a time between the first time and the second time, that the dump event indicated by the sensor data is a suspected false dump event;

causing, by the computing system, an indication of the suspected false dump event to be displayed in a user interface; and receiving, by the computing system, and via the user interface, user input confirming that the suspected false dump event is the false dump event, wherein the computing system determines, at the second time, that the dump event is the false dump event based on the user input.

3. The computer-implemented method of claim 2, wherein the computing system uses at least one rule to determine that the dump event is the suspected false dump event.

4. The computer-implemented method of claim 2, wherein:

the computing system uses a machine learning model to generate a prediction that the dump event is the false dump event, the prediction being associated with a confidence level, the computing system determines that the dump event is the suspected false dump event based on the confidence level of the prediction being below a threshold confidence level, and the machine learning model is trained on historical data to identify data features that are predictive of false dump events.

5. The computer-implemented method of claim 4, comprising re-training, by the computing system, the machine learning model based on the user input confirming that the suspected false dump event is the false dump event.

6. The computer-implemented method of claim 1, wherein determining that the dump event is the false dump event and suppressing the false dump event comprises:

generating a prediction, with a confidence level, that the dump event is the false dump event by the computing system using a machine learning model trained on historical data to identify data features that are predictive of false dump events;

determining, by the computing system, that the confidence level of the prediction is above a threshold confidence level; and suppressing, by the computing system, the false dump event based on the confidence level of the prediction being above the threshold confidence level.

7. The computer-implemented method of claim 1, wherein suppressing the false dump event, based on determining that the dump event was erroneously indicated by the sensor data, further comprises:

using additional sensor data, from the one or more sensors of the machine, to retroactively determine that the work cycle segment ended at:

a different time than the particular time, and a different location than the particular location.

8. The computer-implemented method of claim 1, wherein the machine is an autonomous machine that autonomously performs instances of the work cycle, including the work cycle segment, at the worksite.

9. A computing system, comprising:

a processor; and a memory having stored thereon computer-executable instructions that, when executed by the processor, cause the processor to:

generate a control signal that causes a machine, separate from the computing system, to perform a work cycle comprising a dump event;

receive, via a transmission from the machine, sensor data captured by one or more sensors of the machine, wherein the sensor data is indicative of operations of the machine at a worksite during performance of the work cycle in response to the control signal;

determine, at a first time, that the sensor data indicates that the machine performed the dump event, during performance of the work cycle, at a particular time and at a particular location;

update tracking data associated with the worksite in response to determining that the sensor data indicates that the machine performed the dump event, wherein:

the tracking data is updated to indicate that a work cycle segment of the work cycle, performed by the machine, ended at the particular time and at the particular location based on the dump event;

determine, at a second time, that the dump event was erroneously indicated by the sensor data and is a false dump event that did not occur; and suppress the false dump event by re-determining the tracking data based on determining that the dump event was erroneously indicated by the sensor data, wherein re-determining the tracking data comprises:

retroactively adjusting the tracking data to indicate that the work cycle segment did not end at the particular time and at the particular location.

10. The computing system of claim 9, wherein the computer-executable instructions cause the processor to:

determine, based on at least one rule at a time between the first time and the second time, that the dump event indicated by the sensor data is a suspected false dump event;

cause an indication of the suspected false dump event to be displayed in a user interface; and receive, via the user interface, user input confirming that the suspected false dump event is the false dump event, wherein the processor determines, at the second time, that the dump event is the false dump event based on the user input.

11. The computing system of claim 9, wherein the computer-executable instructions cause the processor to generate a prediction, with a confidence level, that the dump event is the false dump event using a machine learning model trained on historical data to identify data features that are predictive of false dump events.

12. The computing system of claim 11, wherein the computer-executable instructions cause the processor to:

determine that the confidence level of the prediction is above a threshold confidence level; and suppress the false dump event based on the confidence level of the prediction being above the threshold confidence level.

13. The computing system of claim 11, wherein the computer-executable instructions cause the processor to:

determine that the confidence level of the prediction is below a threshold confidence level;

determine, at a time between the first time and the second time based on the confidence level of the prediction being below the threshold confidence level, that the dump event is a suspected false dump event;

cause an indication of the suspected false dump event to be displayed in a user interface;

receive, via the user interface, user input confirming that the suspected false dump event is the false dump event; and suppress the false dump event based on the user input.

14. The computing system of claim 13, wherein the computer-executable instructions cause the processor to re-train the machine learning model based on the user input confirming that the suspected false dump event is the false dump event.

15. The computing system of claim 9, wherein suppressing the false dump event, based on determining that the dump event was erroneously indicated by the sensor data, further comprises:

using additional sensor data, from the one or more sensors of the machine, to retroactively determine that the work cycle segment ended at:

a different time than the particular time, and a different location than the particular location.

16. A system comprising:

a machine comprising:

a work tool configured to transport and dump material at a worksite;

a sensor configured to capture sensor data associated with the work tool; and a wireless communication interface configured to transmit the sensor data; and a computing system configured to:

generate a control signal that causes the machine to perform a work cycle comprising a dump event;

receive the sensor data captured by the sensor of the machine and transmitted by the wireless communication interface of the machine, wherein the sensor data is indicative of operations of the machine at the worksite during performance of the work cycle in response to the control signal;

determine, at a first time, that the sensor data indicates that the machine performed the dump event, during performance of the work cycle, at a particular time and at a particular location;

update tracking data associated with the worksite in response to determining that the sensor data indicates that the machine performed the dump event, wherein:

the tracking data is updated to indicate that a work cycle segment of the work cycle, performed by the machine, ended at the particular time and at the particular location based on the dump event;

determine, at a second time, that the dump event was erroneously indicated by the sensor data and is a false dump event that did not occur; and suppress the false dump event by re-determining the tracking data based on determining that the dump event was erroneously indicated by the sensor data, wherein re-determining the tracking data comprises:

retroactively adjusting the tracking data to indicate that the work cycle segment did not end at the particular time and at the particular location.

17. The system of claim 16, wherein the computing system is configured to:

determine, based on at least one rule at a time between the first time and the second time, that the dump event indicated by the sensor data is a suspected false dump event;

cause an indication of the suspected false dump event to be displayed in a user interface; and receive, via the user interface, user input confirming that the suspected false dump event is the false dump event, wherein the computing system determines, at the second time, that the dump event is the false dump event based on the user input.

18. The system of claim 16, wherein the computing system is configured to generate a prediction, with a confidence level, that the dump event is the false dump event, using a machine learning model trained on historical data to identify data features that are predictive of false dump events.

19. The system of claim 18, wherein the computing system is configured to:

determine that the confidence level of the prediction is above a threshold confidence level; and suppress the false dump event based on the confidence level of the prediction being above the threshold confidence level.

20. The system of claim 18, wherein the computing system is configured to:

determine that the confidence level of the prediction is below a threshold confidence level;

determine, at a time between the first time and the second time based on the confidence level of the prediction being below the threshold confidence level, that the dump event is a suspected false dump event;

cause an indication of the suspected false dump event to be displayed in a user interface;

receive, via the user interface, user input confirming that the suspected false dump event is the false dump event; and suppress the false dump event based on the user input.

* * * * *